(12) United States Patent
Terasaki

(10) Patent No.: US 7,360,236 B2
(45) Date of Patent: Apr. 15, 2008

(54) DATA RECEPTION APPARATUS, DATA COMMUNICATION APPARATUS, INFORMATION PRESENTATION APPARATUS, TELEVISION CONTROL APPARATUS, DATA RECEPTION METHOD, DATA COMMUNICATION METHOD, INFORMATION PRESENTATION METHOD, AND TELEVISION CONTROL METHOD

(75) Inventor: Hiroshi Terasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 1179 days.

(21) Appl. No.: 10/060,665

(22) Filed: Jan. 30, 2002

(65) Prior Publication Data

US 2002/0116703 A1 Aug. 22, 2002

(30) Foreign Application Priority Data

Jan. 31, 2001 (JP) ............................. 2001-023817

(51) Int. Cl.
*H04N 7/173* (2006.01)
*H04N 7/16* (2006.01)

(52) U.S. Cl. .................. 725/146; 725/93; 725/115; 725/145

(58) Field of Classification Search .............. 725/83, 725/115, 153, 145, 116, 146; 379/100.12, 379/142.01
See application file for complete search history.

(56) References Cited

U.S. PATENT DOCUMENTS 5,835,126 A * 11/1998 Lewis .................... 725/83
6,021,324 A * 2/2000 Sizer et al. ............ 455/403
6,100,916 A * 8/2000 August et al. ............ 725/28
6,219,355 B1 * 4/2001 Brodigan ................ 370/486
6,574,798 B1 * 6/2003 Bradley et al. .......... 725/153
2003/0027565 A1* 2/2003 Bossemeyer et al. ..... 455/422
2003/0097659 A1* 5/2003 Goldman ................ 725/89

FOREIGN PATENT DOCUMENTS

| JP | 5-114937 | 5/1993 |
|---|---|---|
| JP | 8-115422 | 5/1996 |
| JP | 9-312689 | 12/1997 |
| JP | 10-240683 | 9/1998 |
| JP | 11-313262 | 11/1999 |
| JP | 11-341146 | 12/1999 |
| JP | 2001-016514 | 1/2001 |

OTHER PUBLICATIONS

Japanese Office Action dated Nov. 24, 2004 with partial translation.

* cited by examiner

*Primary Examiner*—Kieu-Oanh Bui
(74) *Attorney, Agent, or Firm*—Katten Muchin Rosenman LLP

(57) ABSTRACT

A memory stores data supplied to each of a plurality of users via a communication network. A verification unit identifies a user. A reading unit reads data supplied to the user identified by the verification unit from the memory, and presents the data to the user.

18 Claims, 20 Drawing Sheets

FIG. 2A

| ADDRESS INFORMATION | SUPPLIED DATA |
|---|---|
| ADDRESS INFORMATION REPRESENTING "FATHER" | DATA1 |
| ADDRESS INFORMATION REPRESENTING "MOTHER" | DATA2 |
| ADDRESS INFORMATION REPRESENTING "CHILD" | DATA3 |
| ADDRESS INFORMATION REPRESENTING "MOTHER" | DATA4 |
| ADDRESS INFORMATION REPRESENTING "FATHER" | DATA5 |
| ADDRESS INFORMATION REPRESENTING "FATHER" | DATA6 |

FIG. 2B

| | IDENTIFICATION INFORMATION | | | |
|---|---|---|---|---|
| | IMAGE | CHARACTER | VOICE | PASSWORD |
| FATHER | | OSAMU | OSAMU | ABC1234 |
| MOTHER | | MIYOKO | MIYOKO | DEF5678 |
| CHILD | | MIDORI | MIDORI | GHI9012 |

| ADDRESS INFORMATION | SUPPLIED DATA | HARMFUL INFORMATION |
|---|---|---|
| ADDRESS INFORMATION REPRESENTING "FATHER" | DATA1 | INCLUDING |
| ADDRESS INFORMATION REPRESENTING "MOTHER" | DATA2 | NON |
| ADDRESS INFORMATION REPRESENTING "CHILD" | DATA3 | NON |
| ADDRESS INFORMATION REPRESENTING "MOTHER" | DATA4 | INCLUDING |
| ADDRESS INFORMATION REPRESENTING "FATHER" | DATA5 | NON |
| ADDRESS INFORMATION REPRESENTING "FATHER" | DATA6 | NON |

| USER | URL |
|---|---|
| FATHER | http://www.abc.com |
| MOTHER | http://www.def.com |
| CHILD | http://www.ghi.com |
| MOTHER | http://www.jkl.com |
| FATHER | http://www.mno.com |
| FATHER | http://www.pqr.com |

FIG. 15B

| USER | LATEST DATA |
|---|---|
| FATHER | DATA11, DATA12, DATA13, |
| MOTHER | DATA21, DATA22, DATA23, |
| CHILD | DATA31, DATA32, DATA33, |

FIG. 17A

| USER | WATCHING LOG |
| --- | --- |
| | INFORMATION REGARDING WATCHING PROGRAM |
| FATHER | PROGRAM INFORMATION 11, PROGRAM INFORMATION 12, · · · |
| MOTHER | PROGRAM INFORMATION 21, PROGRAM INFORMATION 22, · · · |
| CHILD | PROGRAM INFORMATION 31, PROGRAM INFORMATION 32, · · · |

FIG. 17B

| USER | PRE-ANNOUNCEMENT INFORMATION |
| --- | --- |
| | INFORMATION REGARDING RECOMMENDED PROGRAM |
| FATHER | PROGRAM INFORMATION 41, PROGRAM INFORMATION 42, · · · |
| MOTHER | PROGRAM INFORMATION 51, PROGRAM INFORMATION 52, · · · |
| CHILD | PROGRAM INFORMATION 61, PROGRAM INFORMATION 62, · · · |

DATA RECEPTION APPARATUS, DATA COMMUNICATION APPARATUS, INFORMATION PRESENTATION APPARATUS, TELEVISION CONTROL APPARATUS, DATA RECEPTION METHOD, DATA COMMUNICATION METHOD, INFORMATION PRESENTATION METHOD, AND TELEVISION CONTROL METHOD

BACKGROUND OF THE INVENTION

1. Field of the Invention

The present invention relates to a data reception apparatus, a data communication apparatus, an information presentation apparatus, a television control apparatus, a data reception method, a data communication method, an information presentation method, and a television control method capable of distinguishing a plurality of users from each other.

2. Description of the Related Art

Usually, one household has one apparatus for each type of home communication apparatus such as a telephone, a fax machine, a computer, and the like. That is, each communication apparatus is used by a plurality of users.

For example, a fax machine prints and outputs all received data without distinction. In other words, a fax machine outputs received data without distinguishing a plurality of users. Therefore, a user who is not the intended recipient of the data may be able to read the output data. As a result, the privacy of the intended recipient cannot securely be protected.

Such a problem may also be caused in case of a telephone answering machine, an e-mail, and the like.

SUMMARY OF THE INVENTION

Accordingly, it is an object of the present invention to provide a data reception apparatus, a data communication apparatus, an information presentation apparatus, a television control apparatus, a data reception method, a data communication method, an information presentation method, and a television control method capable of distinguishing a plurality of users. And it is another object of the present invention to provide a data reception apparatus and a data reception method capable of protecting privacy of a user.

To accomplish the above objects, a data reception apparatus according to a first aspect of the present invention comprises:

a first memory which stores data supplied to each of a plurality of users via a communication network;

a verifier which verifies a user, and a presenter which reads data which is supplied to the user who has been verified by the verifier from the first memory, and presents the data to the user.

According to this invention, a plurality of users can be distinguished from each other, and privacy of each user can be protected.

The data reception apparatus may further comprise:

a second memory which stores identification information for identifying each of the plurality of users; and an inputter which inputs verification information for verifying the user, wherein the verifier verifies the user by using the verification information and the identification information stored in the second memory.

The identification information and the verification information may include one of image data representing a face of the user, character data representing a name of the user, and audio data representing a name of the user.

The data may be data for use of a communication apparatus.

The presenter may present the data to the user via a television set.

The communication apparatus may be one of a telephone, a fax machine, and a computer.

The data reception apparatus may further comprise a replier which sends reply data for notifying that the data has been received to a sender of the data.

The data reception apparatus may further comprise:

a determiner which determines whether or not the supplied data includes information harmful to a specific user, and a prohibiter which prohibits the presenter from reading the data which is determined as including harmful information by the determiner from the first memory, in a case where a user verified by the verifier is the specific user.

The determiner may pre-store an image and a keyword representing the harmful information, and determine whether or not the supplied data includes the harmful information by determining whether or not the supplied data includes data representing the pre-stored image and keyword.

To accomplish the above objects, a data reception apparatus according to a second aspect of the present invention comprises:

a presenter which presents data supplied from outside to a user via an external device;

a verifier which verifies a user of the external device; and a preventer which prevents harmful information from being presented to the user verified by the verifier, in a case where data including the harmful information which is harmful to the user is supplied.

The data reception apparatus may farther comprise:

a memory which stores identification information for identifying each of a plurality of users of the external device; and an inputter which inputs verification information for verifying the user.

The verifier may verify the user by using the verification information and the identification information stored in the memory.

The preventer may pre-store an image and a keyword representing the harmful information, and prevent the harmful information from being presented to the user in a case where the supplied data includes data representing the pre-stored image and keyword.

The preventer may prohibit the presenter from supplying data to the external device, in a case where the data which has been supplied from outside includes information harmful to the user verified by the verifier.

The external device may be a television set.

The presenter may supply data of a television program supplied from outside to the television set.

The data reception apparatus may further comprise a detector which detects a television program including the harmful information.

The preventer may determine whether or not the television program which is displayed on the television set corresponds to the television program detected by the detector, and prohibit the presenter from supplying the data to the television set in a case where it is determined that the displayed television program corresponds to the television program detected by the detector.

The detector may retrieve information regarding a television program via a public network or an antenna, and previously detect a television program which includes the harmful information by using the retrieved information.

In a case where data including the harmful information is supplied, the preventer may prevent the harmful information from being supplied to the user by processing the harmful information included in the data.

To accomplish the above objects, a data communication apparatus according to a third aspect of the present invention comprises:

a downloader which downloads latest data from an external server which has been accessed by each of a plurality of users by using a communication apparatus;

a verifier which verifies a user of the communication apparatus; and a presenter which presents the latest data downloaded by the downloader from the external server which has been accessed by the user verified by the verifier, to the user via the communication apparatus.

The data communication apparatus may further comprise:

a memory which stores identification information for identifying each of the plurality of users of the communication apparatus; and an inputter which inputs verification information for verifying the user.

The verifier may verify the user by using the verification information and the identification information stored in the memory.

To accomplish the above objects, an information presentation apparatus according to a fourth aspect of the present invention comprises:

an analyzer which analyzes a preference of each of a plurality of users regarding a television program;

a detector which detects a television program which suits the preference of each of the plurality of users analyzed by the analyzer, an identifier which identifies a user who is watching television; and a presenter which presents information regarding a television program which is detected by the detector and suits the preference of the user who is identified by the identifier, to the user.

To accomplish the above objects, a television control apparatus according to a aspect of the present invention comprises:

an analyzer which analyzes a preference of each of a plurality of users regarding a television program;

a detector which detects a television program which suits the preference of each of the plurality of users analyzed by the analyzer;

an identifier which identifies a user who is in front of a television set; and a displayer which displays a television program which suits the preference of the user identified by the identifier on the television set.

The displayer may include a changer which changes channels of the television set at a time when broadcast of the television program starts.

The displayer may include a power switcher which switches on power of the television set in a case where power of the television set is not switched on at a time when broadcast of the television program starts.

To accomplish the above objects, a data reception method according to a sixth aspect of the present invention comprises:

storing data supplied to each of a plurality of users via a communication network in a memory;

verifying a user; and reading data supplied to the verified user from the memory and presenting the data to the user.

To accomplish the above objects, a data reception method according to a seventh aspect of the present invention comprises:

verifying a user of an external device;

receiving data supplied from outside and presenting the data to the verified user via the external device; and preventing harmful information from being presented to the verified user, in a case where data including the harmful information which is harmful to the user is supplied.

To accomplish the above objects, a data communication method according to the seventh aspect of the present invention comprises:

downloading latest data from an external server which has been accessed by each of a plurality of users by using a communication apparatus;

verifying a user of the communication apparatus; and presenting the latest data downloaded from the external server which has been accessed by the verified user to the user via the communication apparatus.

To accomplish the above objects, an information presentation method according to en eighth aspect of the present invention comprises:

analyzing a preference of each of a plurality of users regarding a television program;

detecting a television program which suits the analyzed preference of each of the plurality of users;

identifying a user who is watching television; and presenting information regarding a television program which suits the preference of the identified user to the user via the television.

To accomplish the above objects, a television control method according to a ninth aspect of the present invention comprises:

analyzing a preference of each of a plurality of users regarding a television program;

detecting a television program which suits the analyzed preference of each of the plurality of users;

identifying a user who is in front of a television set; and displaying a television program which suits the preference of the identified user on the television set by controlling the television set.

BRIEF DESCRIPTION OF THE DRAWINGS

These objects and other objects and advantages of the present invention will become more apparent upon reading of the following detailed description and the accompanying drawings in which:

FIG. 2A is a diagram showing data stored in a RAM included in a server which constitutes the data communication system shown in FIG. 1, and FIG. 2B is a diagram showing identification information stored in a memory included in the server;

FIG. 8 is a diagram showing data stored in a RAM included in a server which constitutes the data communication system shown in FIG. 7;

FIGS. 15A and 15B are diagrams showing data stored in a RAM included in a server which constitutes the data communication system shown in FIG. 14;

FIGS. 17A and 17B are diagrams showing data stored in a RAM included in a server which constitutes the data communication system shown in FIG. 16;

DETAILED DESCRIPTION OF THE PREFERRED EMBODIMENTS

First Embodiment

A data communication system according to a first embodiment of the present invention will now be explained with reference to the drawings.

The data communication system according to the first embodiment receives and stores various data supplied via a communication network. In response to a data read request input by a user, the data communication system outputs data which is addressed to the user who has input the read request.

Figure 1:
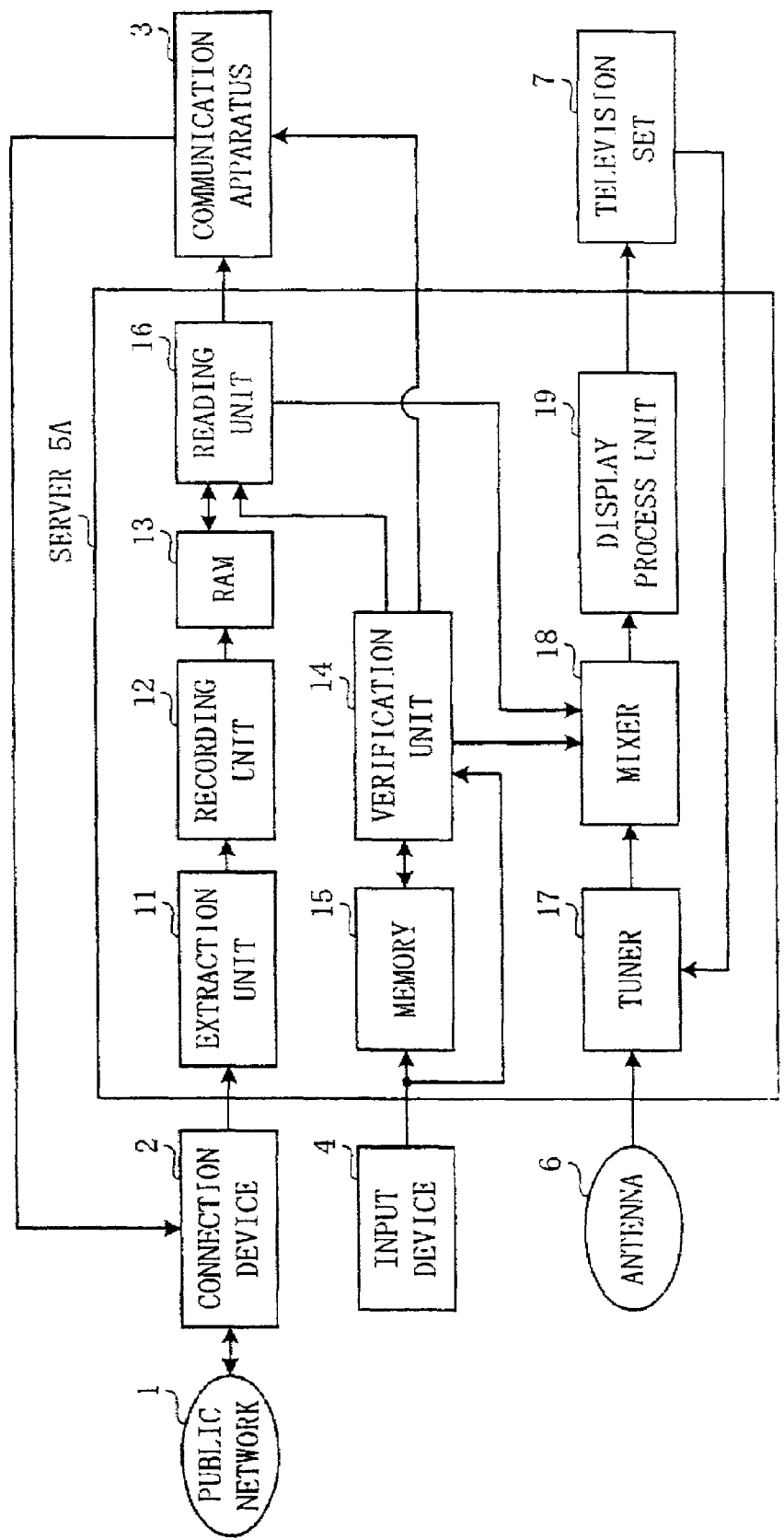
FIG. 1 is a block diagram showing a structure of a data communication system according to a first embodiment.

The data communication system comprises a public network 1, a connection device 2, a communication apparatus 3, an input device 4, a server 5A, an antenna 6, a television set 7, as shown in FIG. 1.

The public network 1 is a communication network such as the ISDN (integrated Services Digital Network) used for transmission and reception of various data including audio data, video data, and the like.

The connection device 2 serves as a modem, and connects the public network 1, the communication apparatus 3, and the server 5A. In a case where data supplied via the public network 1 is analog data, the connection device 2 converts the supplied data into digital data.

The communication apparatus 3 is a telephone, a fax machine, a computer, or the like, and used by a plurality of users. The communication apparatus 3 receives via the server 5A, data supplied from another communication apparatus via the public network 1. The communication apparatus 3 transmits data to another communication apparatus via the public network 1 in accordance with a user's operation.

The input device 4 inputs identification information for identifying a user to the server 5A in accordance with a user's operation. The input device 4 inputs verification information for verifying a user to the server 5A in accordance with a user's operation. The input device 4 inputs a data read request for requesting data to be read out to the server 5A in accordance with a user's operation.

The input device 4 comprises a plurality of input buttons, a camera, a mike, and the like. The input device 4 acquires information (data) necessary for identifying (verifying) a user by the input buttons, a camera, a mike, and the like, and inputs the acquired information to the server 5A. As will be described later, the identification information and the verification information include image data representing a user's face, character data representing a user's name, audio data representing a user's name, a password, and the like.

The server 5A stores identification information of a user supplied from the input device 4. The server 5A stores data supplied from another communication apparatus via the public network 1. The server 5A verifies (identifies) a user with the use of the verification information supplied from the input device 4 and pre-stored identification information.

In a case where the server 5A stores data addressed to a verified user, the server 5A notifies the verified user that it stores data supplied from another communication apparatus. And in accordance with a read request supplied from the input device 4 by a user, the server 5A outputs data addressed to the user who has input the read request to the communication apparatus 3 or to the television set 7. The structure of the server 5A will be specifically described later.

The antenna 6 receives various electric waves such as terrestrial broadcasting waves, CS (Communication Satellite) broadcasting waves, BS (broadcasting satellite) broadcasting waves, digital terrestrial broadcasting waves, and/or BS digital broadcasting waves.

The television set 7 receives display data for displaying a program supplied on an electric wave via the server 5A. Then, the television set 7 displays the program in accordance with the display data supplied from the server 5A.

The structure of the server 5A will now be specifically explained.

The server 5A comprises an extraction unit 11, a recording unit 12, a RAM (Random Access Memory) 13, a verification unit 14, a memory 15, a reading unit 16, a tuner 17, a mixer 18, and a display process unit 19, as shown in FIG. 1.

The extraction unit 11 extracts from data supplied from another communication apparatus via the public network 1 and the connection device 2, address information representing a destination (recipient) of the data. The address information is data representing a name, an email address, or the like of a recipient of the data.

As shown in FIG. 2A, the recording unit 12 stores the data supplied from another communication apparatus and the address information extracted from the data in association with each other in the RAM 13 which can write or read data at any time.

FIG. 2A shows a case where the communication apparatus 3 is used by a "father", a "mother", and a "child". And FIG. 2A shows a state where there are supplied three data for the "father", two data for the "mother", and one data for the "child".

The verification unit 14 applies a later-described data process to identification information of a user supplied from the input device 4 in accordance with a previously provided program. Then, the verification unit 14 stores the processed identification information in the memory 15.

The verification unit 14 applies a later-described data process to verification information of a user supplied from the input device 4 in accordance with a previously provided program. Then, the verification unit 14 verifies the user by using the processed verification information and the identification information stored in the memory 15.

The verification unit 14 controls the reading unit 16, and determines whether there is any data stored in the RAM 13 that is addressed to the verified user. Then, the verification unit 14 notifies the verified user that there is/is not data stored that is addressed to the verified user. Specifically, the verification unit 14 outputs notification data (image data or audio data) which is a message representing the content of the notification to the mixer 18.

The verification unit 14 instructs the reading unit 16 to read data addressed to the verified user in response to a read request supplied from the input device 4 in accordance with the verified user's operation.

The memory 15 comprises a hard disk, a RAM, and/or a ROM (Read Only Memory), and stores identification information in accordance with a control of the verification unit 14. The memory 15 stores a program for controlling the verification unit 14 to activate.

FIG. 2B is a diagram showing identification information stored in the memory 15.

As shown in FIG. 2B, image data representing a user's face, character data representing the user's name, audio data representing the user's name, and a password are stored in association with one another in the memory 15 user by user.

It is feared that the privacy of a user is not securely protected only with a password, since a password can be easily issued. Accordingly, the image data, the character data, and the audio data as described above are included in the identification information as information (data) for identifying a user.

The image data representing a face is used for verifying a user, for example. The character data representing a name is used for distinguishing a recipient of fax data. And the audio data representing a name is used for distinguishing a recipient of a message supplied to a telephone answering machine.

Other than the above, data representing a biological feature (biometrics) such as a fingerprint, a retina, an iris, a palm shape, a voiceprint, and handwriting may be included in the identification information. The user verification may be performed by using an IC card or a magnetic card on which information for identifying a user is recorded.

The reading unit 16 reads data stored in the RAM 13 in accordance with a control of the verification unit 14, and outputs the data to the mixer 18 or to the communication apparatus 3.

The tuner 17 selects an electric wave of a channel specified by a channel selection signal from the television set 7, from among electric waves received by the antenna 6.

Then, the tuner 17 converts the selected electric wave into a video signal having an intermediate frequency, and outputs the video signal to the mixer 18.

The mixer 18 synthesizes the data from the verification unit 14 or the data from the reading unit 16 with the data video signal supplied from the tuner 17. Then, the mixer 18 outputs the synthesized signal (data) to the display process unit 19.

The display process unit 19 converts a form of data supplied from the mixer 18 into a form in which the data can be displayed on the television set 7, and outputs the data as display data to the television set 7.

The data process which the verification unit 14 applies to the identification information and the verification information (specifically, image data) will be explained.

The verification unit 14 processes image data representing an object (face, figure, character, or the like) to be identified (verified) acquired via a camera by the following procedures.

(1) Removing a distortion, a noise, a limb darkening, etc. of the image.

(2) Smoothing and sharpening the image.

(3) Applying a process called two-dimensional filtering to the image.

(4) Converting the image from multi-value data to binary data so that it becomes easier to extract a feature of the object (binarization).

(5) Extracting a frame line of the object by making a line of the object thinner.

(6) Normalizing the image by expansion and reduction.

(7) Moving parallel or rotating the image if necessary.

(8) Adjusting and normalizing the shading of the image if necessary.

(9) Extracting characteristic elements such as an edge, in outline, a line component, a texture, etc. from the digital image obtained by the above procedures by area division.

The verification unit 14 identifies (verifies) the object by performing pattern matching, statistical distinction, and/or structural distinction with the use of the features of the object extracted by the above procedures.

Especially, in a case where the object is a face, identification (verification) is performed by using one of a profile image, a front face image, a three-dimensional image.

In case of using a profile image, an outline from the forehead to the chin is extracted as a feature for identifying a user. A relatively high verification rate has been obtained in verification tests using profile images.

In case of using a front face image, outlines, sizes, and positions of the entire face, eyebrows, eyes, a nose, and lips are extracted as features for identifying a user.

In case of using a three-dimensional image, three-dimensional information such as concave and convex in or on the surface of the face is extracted as features for identifying a user in addition to the above-described two-dimensional information obtained from the profile image and the front face image.

The verification unit 14 identifies (verifies) a user by one of the above-described methods.

Next, an operation of the data communication system will be explained.

Figure 3:
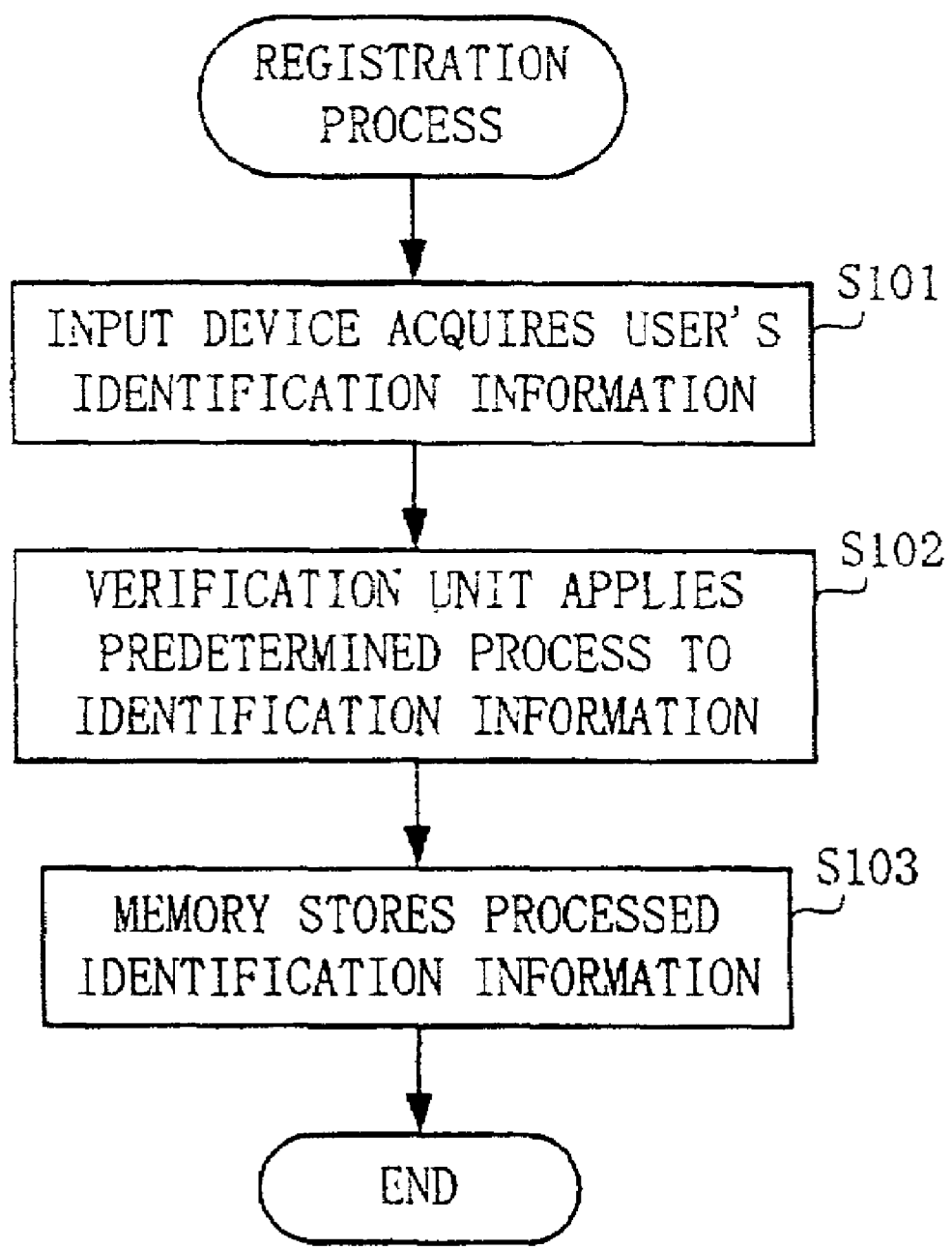
FIG. 3 is a flowchart for explaining a registration process performed by the data communication system shown in FIG. 1.

Each user of the communication apparatus 3 is registered in the server 5A by a registration process shown in FIG. 3.

The input device 4 acquires information for identifying a user (a face image, characters representing a name, audio representing a name, etc.) via the input buttons, the camera, and the mike in response to a predetermined operation performed by the user (step S101). The input device 4 outputs the acquired information to the verification unit 14 of the server 5A as the identification information of the user.

In response to the supply of the identification information from the input device 4, the verification unit 14 applies the above described data process to the supplied identification information in accordance with a program stored in the memory 15 (step S102).

Then, the verification unit 14 controls the memory 15 to store the processed identification information (step S103), and the registration process is terminated.

By the above registration process, each user of the communication apparatus 3 is registered in the server 5A.

Data supplied from another communication apparatus via the public network 1 is supplied to the server 5A via the connection device 2. The extraction unit 11 of the server 5A extracts address information representing a destination of the supplied data from the supplied data. The recording unit 12 records the data supplied from another communication apparatus and the address information extracted from the supplied data in association with each other in the RAM 13.

Data supplied from another communication apparatus via the public network 1 is stored in the server 5A by following the above procedures.

Each user of the communication apparatus 3 retrieves data addressed to himself/herself from the server 5A, as described below.

EXAMPLE 1

Figure 4A:
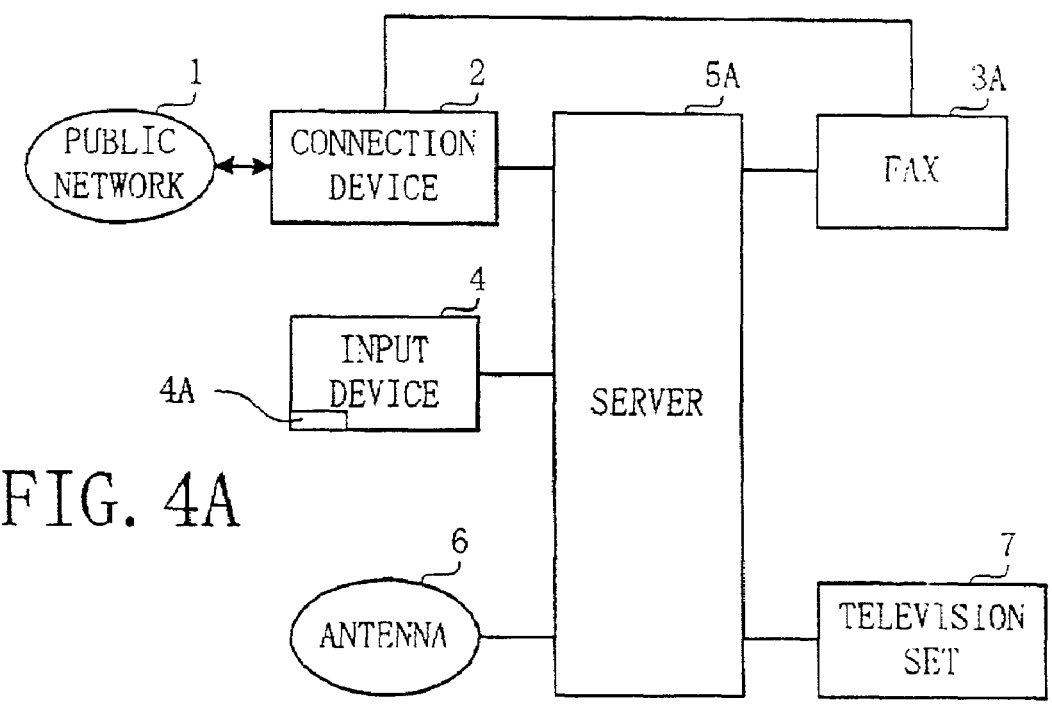
FIG. 4A is a diagram showing a first example of the data communication system according to the first embodiment.

A case where the communication apparatus 3 is a fax machine 3A, and user verification is performed by using a camera 4A of the input device 4 will be explained. FIG. 4A shows a structure of this case.

The RAM 13 of the server 5A stores three fax data for the "father", two fax data for the "mother", and one fax data for the "child", as shown in FIG. 2A. The fax data is stored in the RAM 13 as text data or image data, for example.

First, the "child" turns on the power of the television set 7. The "child" has his/her face photographed by the camera 4A of the input device 4, and inputs a fax data confirmation request for confirming whether there is a fax data by operating the input device 4 with predetermined procedures.

When the television set 7 is turned on, an electric wave received by the antenna 6 goes through the tuner 17, the mixer 18, and the display process unit 19, and is supplied to the television set 7 as display data. Due to this, a program of a predetermined channel is displayed on the television set 7.

The input device 4 photographs the face of the "child" by the camera 4A in response to a predetermined operation performed by the "child". Then, the input device 4 outputs the image data representing the photographed face to the verification unit 14 of the server 5A as the verification information of the "child".

Figure 5:
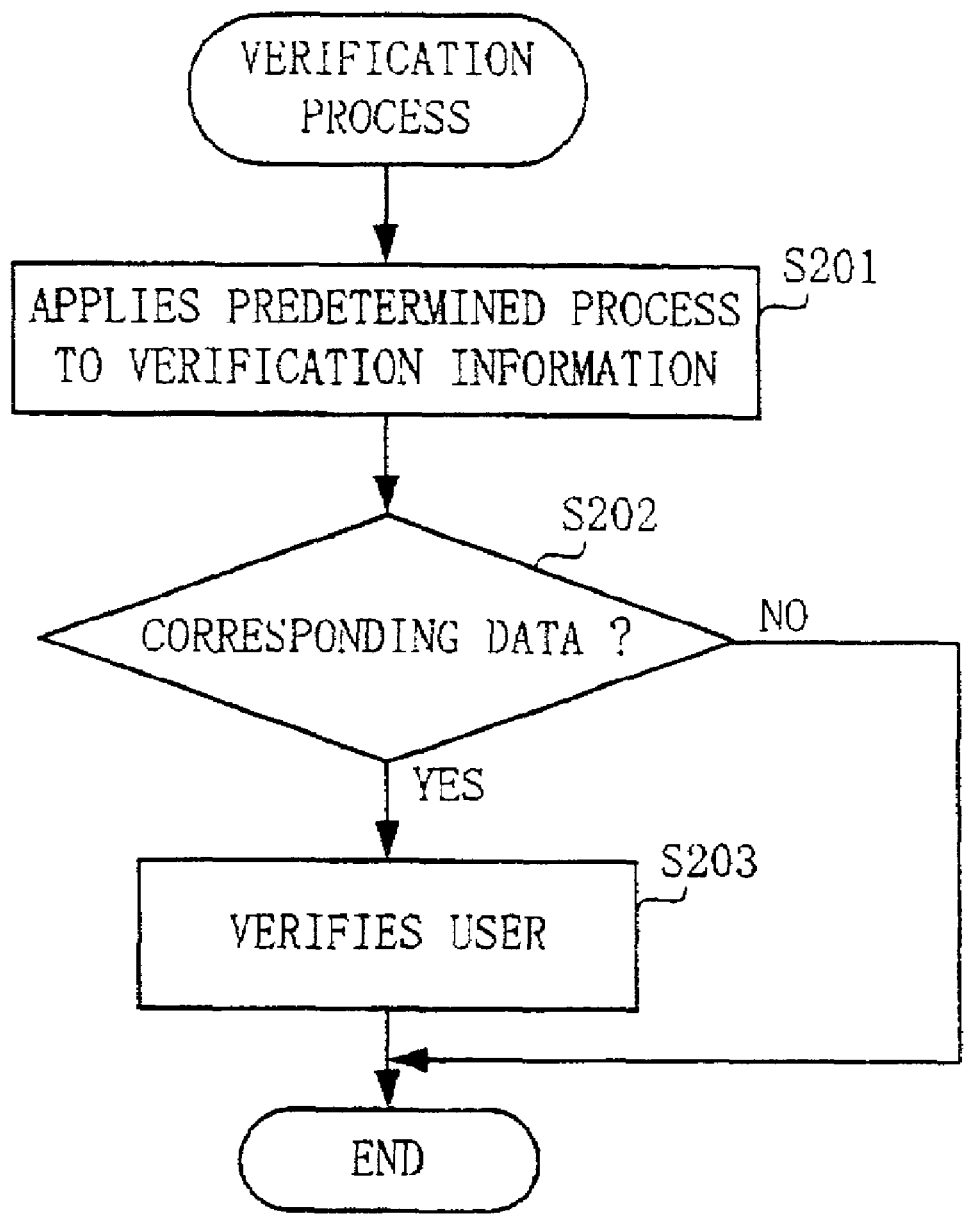
FIG. 5 is a flowchart for explaining a verification process performed by the server included in the data communication system shown in FIG. 1.

The verification unit 14 starts a verification process shown in FIG. 5 in response to the verification information (image data) supplied from the input device 4 in accordance with a program stored in the memory 15.

First, the verification unit 14 applies the above described data process to the supplied verification information (image data) (step S201).

Then, the verification unit 14 determines whether there is data in the identification information store in the memory 15 that corresponds to the processed image data (step S202).

In a case where it is determined that there is no corresponding data (step S202; No), the verification unit 14 determines that the "child" is not registered, and terminates the verification process.

On the other hand, in a case where it is determined that there is corresponding data (step S202; Yes), the verification unit 14 determines that the "child" is registered. Then, the verification unit 14 verifies the "child" (step S203), and terminates the verification process.

The input device 4 inputs the fax data confirmation request to the server 5A in response to a predetermined operation performed by the "child".

In response to the confirmation request from the input device 4, the verification unit 14 of the server 5A controls the reading unit 16, and determines whether or not the RAM 13 stores fax data addressed to the verified "child"

In a case where it is determined that no fax data addressed to the "child" is stored, the verification unit 14 outputs notification data (image data or audio data) representing a message that there is no fax data to the mixer 18.

On the other hand, in a case where it is determined that there is fax data addressed to the "child", the verification unit 14 outputs notification data (image data or audio data) representing a message that there is fax data to the mixer 18.

The mixer 18 synthesizes the notification data supplied from the verification unit 14 to a video signal from the tuner 17. Specifically, in a case where the notification data is image data, the mixer 18 synthesizes the notification data to the video signal so that the message is displayed on the television set 7. And in a case where the notification data is audio data, the mixer 18 mutes an audio signal of a program included in the video signal, and synthesizes the notification data to the video signal. Then, the mixer 18 outputs the synthesized signal to the display process unit 19.

The display process unit 19 converts the signal supplied from the mixer 18 into display data, and outputs the display data to the television set 7. Due to this, the message that there is/is not fax data addressed to the "child" is displayed on the television set 7, or output from a speaker of the television set 7 as audio.

In a case where there is fax data addressed to the "child", the "child" retrieves the fax data addressed to himself/herself from the server 5A by operating the input device 4 with predetermined procedures.

In response to the predetermined operation performed by the "child", the input device 4 inputs a read request for the fax data addressed to the "child" to the server 5A.

In response to the read request from the input device 4, the verification unit 14 of the server 5A instructs the reading unit 16 to read out the fax data addressed to the "child".

The reading unit 16 reads the fax data addressed to the "child" from the RAM 13 in response to the instruction of the verification unit 14, and outputs the fax data to the mixer 18.

The mixer 18 synthesizes the fax data from the reading unit 16 to the video signal from the tuner 17. Then, the mixer 18 outputs the synthesized signal to the display process unit 19.

The display process unit 19 converts the signal supplied from the mixer 18 into display data, and outputs the display data to the television set 7. Due to this, the content of the fax data addressed to the "child" is displayed on the television set 7.

As described above, the server 5A outputs only the fax data addressed to the "child" in response to the read request of the "child". Accordingly, the "child" can retrieve only the fax data addressed to himself/herself from the server 5A.

In a case where the "child" inputs a fax data read request by operating the fax machine 3A, the verification unit 14 may instruct the reading unit 16 to output the fax data to the fax machine 3A in response to the read request supplied from the fax machine 3A. Then, the reading unit 16 may output the fax data read out from the RAM 13 to the fax machine 3A in response to the instruction of the verification unit 14.

EXAMPLE 2

Figure 4B:
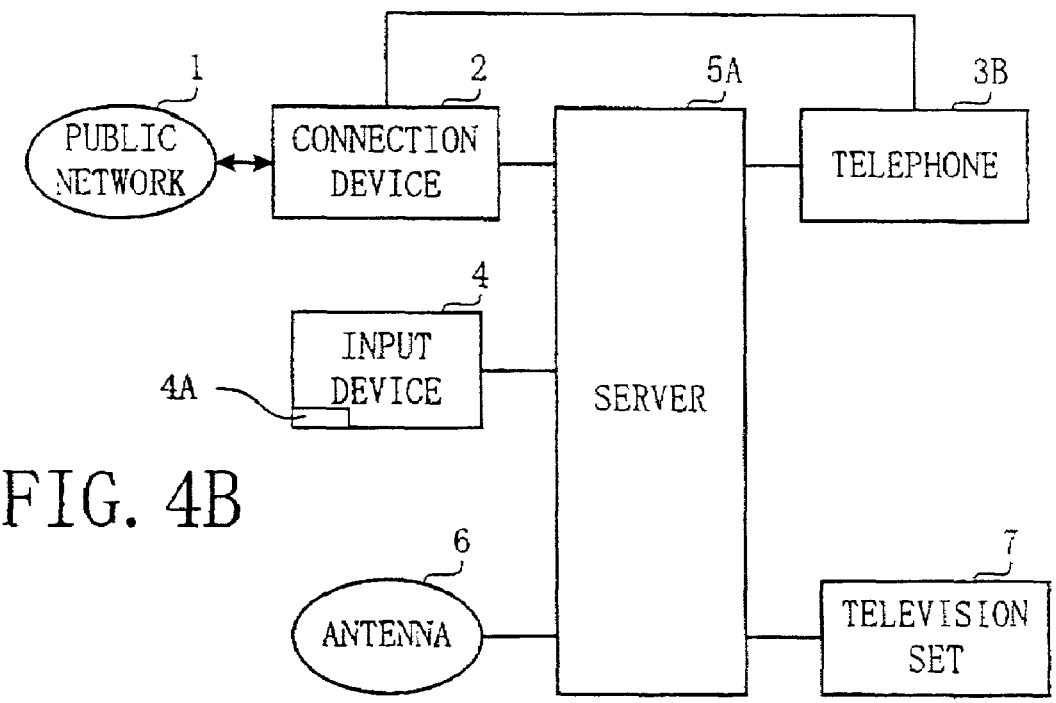
FIG. 4B is a diagram showing a second example of the data communication system according to the first embodiment.

Next, a case where the communication apparatus 3 is a telephone 3B, and user verification is performed by using the camera 4A of the input device 4 will be explained. FIG. 4B shows the structure of this case.

When the telephone 3B is set for the answering machine, a message (audio) supplied to the telephone 3B via the public network 1 is stored in the RAM 13 of the server 5A. As shown in FIG. 2A, the RAM 13 stores three message data for the "father", two message data for the "mother", and one message data for the "child".

Likewise the Example 1, the "child" turns on the power of the television set 7. Then, the "child" has his/her face photographed by the camera 4A of the input device 4, and inputs a message data confirmation request by operating the input device 4 with predetermined procedures.

When the television set 7 is turned on, a program of a predetermined channel is displayed on the television set 7, likewise the Example 1.

And likewise the Example 1, in response to the operation of the "child", the input device 4 photographs the face of the "child", and inputs image data representing the photographed face to the server 5A as verification information. And the input device 4 inputs a message data confirmation request to the server 5A in response to the operation of the "child".

The verification unit 14 of the server 5A executes the verification process shown in FIG. 5 in response to the verification information (image data) from the input device 4. Then, the verification unit 14 determines whether or not the RAM 13 stores message data addressed to the "child" in response to the message data confirmation request from the input device 4.

Then, likewise the Example 1, the verification unit 14 outputs notification data representing a message that message data is/is not stored in the RAM 13 to the mixer 18. Due to this, the message that the RAM 13 stores or does not store message data addressed to the "child" is output from the television set 7.

In a case where there is message data addressed to the "child", the "child" inputs a message data read request by operating the input device 4 with predetermined procedures likewise the Example 1.

In response to the read request supplied from the input device 4 by the operation of the "child", the verification unit 14 instructs the reading unit 16 to read the message data addressed to the "child". The reading unit 16 reads the message data addressed to the "child" from the RAM 13 in response to the instruction of the verification unit 14, and outputs the read message data to the mixer 18. The message data addressed to the "child" is synthesized with a video signal by the mixer 18, converted into display data by the display process unit 19, and supplied to the television set 7.

Due to this, the message addressed to the "child" is output from the speaker of the television set 7 as audio.

As described above, the server 5A outputs only the message data addressed to the "child" in response to the read request of the "child". Therefore, the "child" can retrieve only the message data addressed to himself/herself from the server 5A.

In a case where the "child" inputs a message data read request by operating the telephone 3B, the verification unit 14 may instruct the reading unit 16 to output the message data to the telephone 3B in response to the read request supplied from the telephone 3B. Then, the reading unit 16 may output the message data read from the RAM 13 to the telephone 3B in accordance with the instruction of the verification unit 14.

In Example 1 and Example 2, in a case where it is determined that only the "child" is sitting in front of the television set 7 from the image photographed by the camera 4A, the verification unit 14 may successively output the data addressed to the "child" to the television set 7 after notifying whether there is data or not, without a read request. However, in this case, the camera 4A is arranged in a position from which all the users who are watching the television set 7 can be looked around.

In the above explanation, a case where the "child" retrieves data addressed to the "child" from the server 5A is employed as an example. The same operation and process are executed in a case where the "father" or the "mother" retrieves data addressed to him or her from the server 5A. Due to this, the "father" and the "mother" can also retrieve data addressed to themselves from the server 5A.

As described above, each user can retrieve only the data addressed to himself/herself. Therefore, even if a plurality of users share one communication apparatus 3, the privacy of each user can be protected. And each user can use the communication apparatus 3 as if it were provided for him/her only.

In the above explanation, a case where the communication apparatus 3 is a fax machine 3A, and a case where the communication apparatus 3 is a telephone 3B are shown. However, the communication apparatus 3 may be a computer. That is, supplied data may be an email and the like. In this case, the privacy of each user can be protected by the same operation as above.

In a case where the extraction unit 11 cannot extract address information representing a destination of data, the recording unit 12 may record the data supplied from another communication apparatus and information representing that the destination of the data is unknown in association with each other in the RAM 13. Then, when reading the data stored in the RAM 13, the reading unit 16 may output a message representing that there is data whose destination is unknown to the mixer 18 or to the communication apparatus 3. Thus, the user can be notified of the fact that there is data whose destination is unknown via the communication apparatus 3 or the television set 7.

Second Embodiment

A data communication system according to a second embodiment of the present invention will now be explained with reference to the drawings.

When receiving data supplied from another communication apparatus via a communication network, the data communication system according to the second embodiment sends reply data notifying the reception of the data to the sender of the data.

Figure 6:
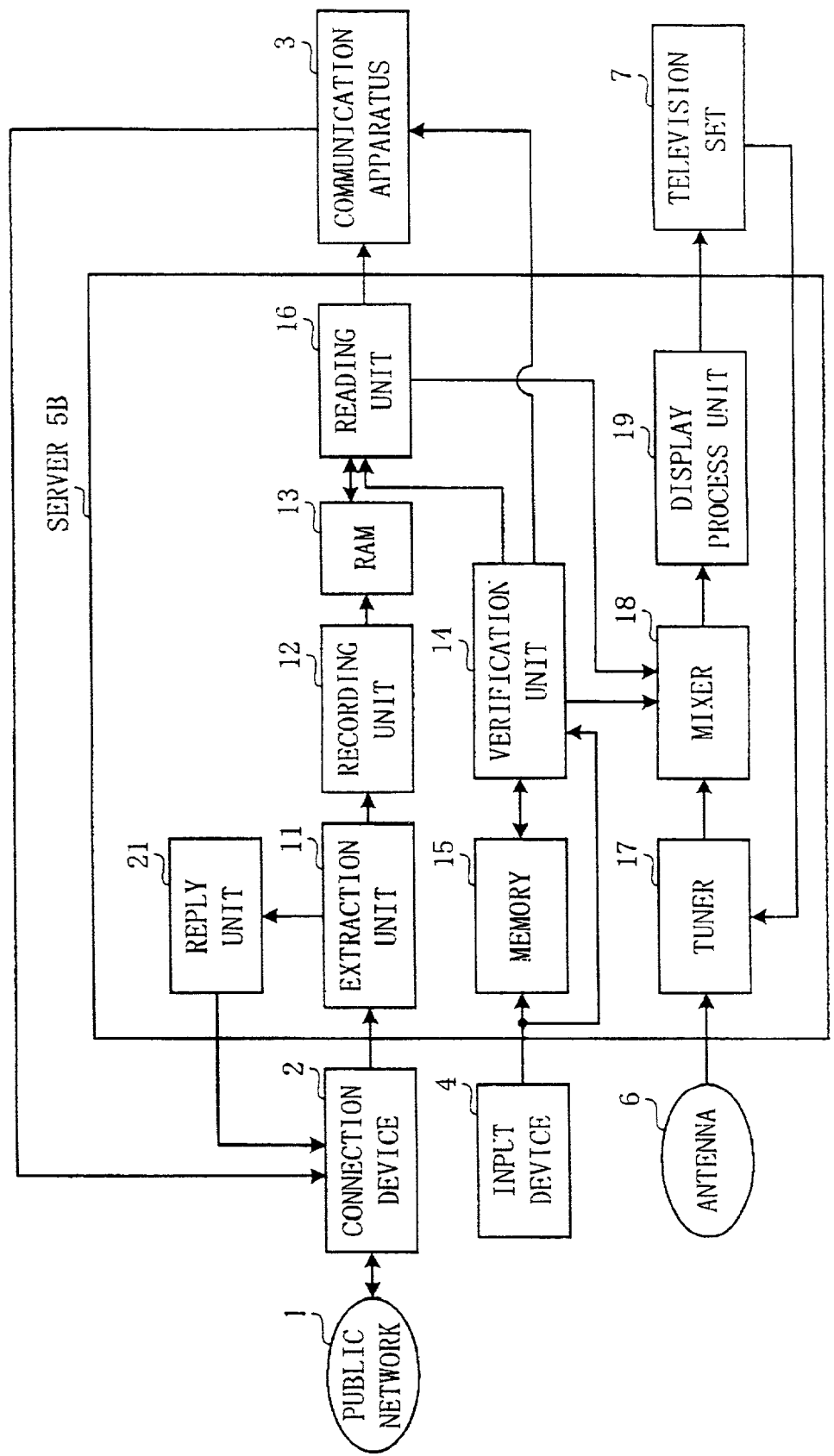
FIG. 6 is a block diagram showing a structure of a data communication system according to a second embodiment.

The data communication system comprises a public network 1, a connection device 2, a communication apparatus 3, an input device 4, a server 5B, an antenna 6, and a television set 7, as shown in FIG. 6.

The public network 1, the connection device 2, the communication apparatus 3, the input device 4, the antenna 6, and the television set 7 are substantially the same as those of the first embodiment.

As shown in FIG. 6, the server 5B comprises a reply unit 21 in addition to the structure of the server 5A of the first embodiment.

The extraction unit 11 extracts address information from data supplied from another communication apparatus via the public network 1 and the connection device 2, and also extracts information representing the sender's place (such as a facsimile number, a telephone number, etc.). Then, the extraction unit 11 outputs the extracted information representing the sender's place to the reply unit 21.

The reply unit 21 pre-stores reply data representing that data has been received. In response to the information representing the sender's place supplied from the extraction unit 11, the reply unit 21 sends the stored reply data to another communication apparatus specified by the supplied information.

In a case where the reply unit 21 is supplied with a fax number from the extraction unit 11, the reply unit 21 sends image data representing a message that data has been received as the reply data. In a case where the reply unit 21 is supplied with a telephone number from the extraction unit 11, the reply unit 21 sends audio data representing a message that data has been received as the reply data.

The structure and operations other than the above are substantially the same as those of the first embodiment.

In the way described above, the privacy of each user can be protected, and also reception of data can be notified to the sender.

The reply unit 21 may send reply data which includes information representing the data reception time to the sender.

Third Embodiment

A data communication system according to a third embodiment of the present invention will now be explained with reference to the drawings.

In a case where data supplied from another communication apparatus includes harmful information, the data communication system according to the third embodiment prevents a "child" from seeing and listening to the data. The harmful information is information doing harm to a "child", such as adult information.

Figure 7:
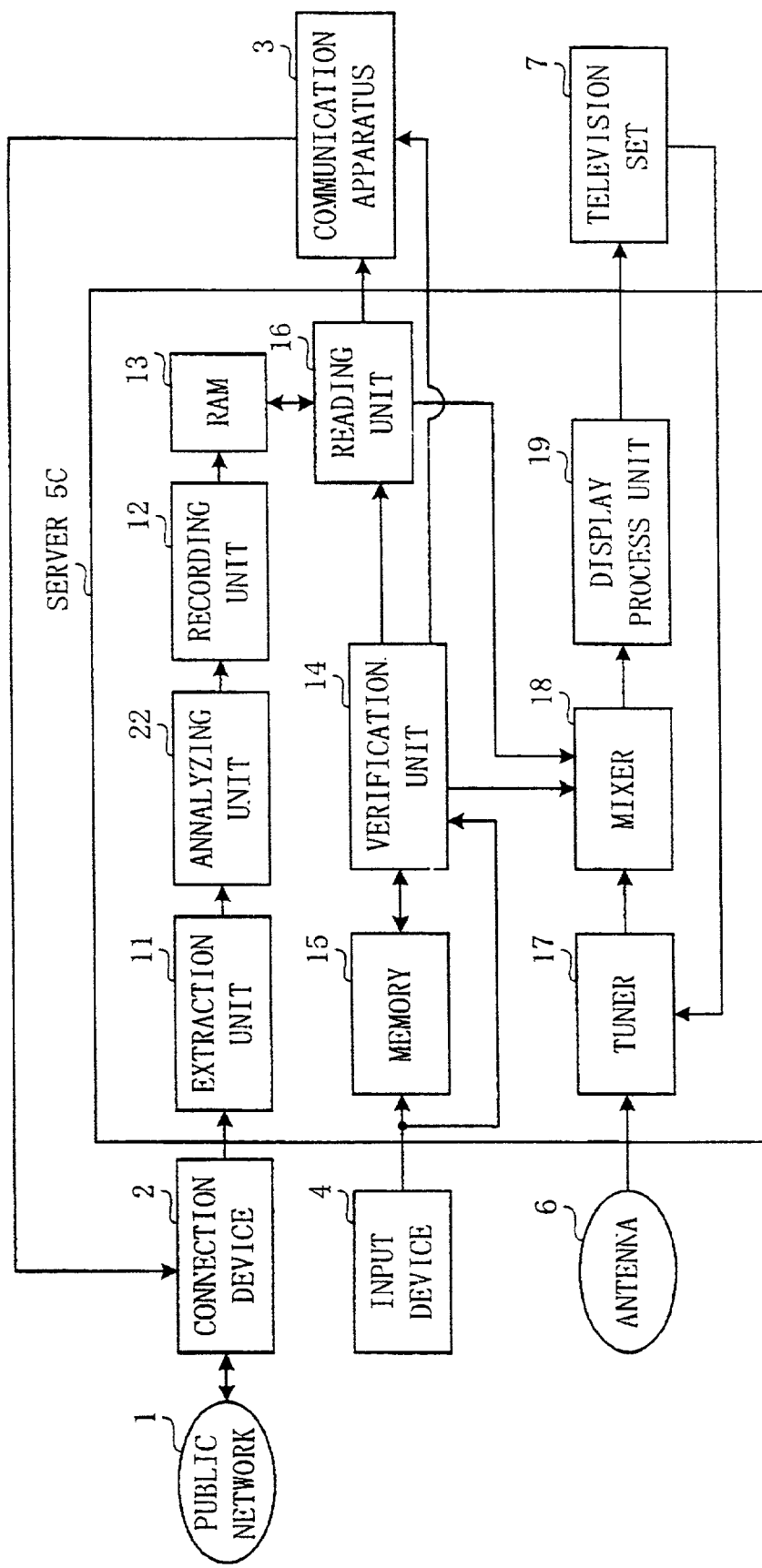
FIG. 7 is a block diagram showing a structure of a data communication system according to a third embodiment.

The data communication system comprises a public network 1, a connection device 2, a communication apparatus 3, an input device 4, a server 5C, in antenna 6, a television set 7, as shown in FIG. 7.

The public network 1, the connection device 2, the communication apparatus 3, the input device 4, the antenna 6, and the television set 7 are substantially the same as those of the first embodiment and the second embodiment.

As shown in FIG. 7, the server 5C comprises an analyzing unit 22 in addition to the structure of the server 5A of the first embodiment.

The analyzing unit 22 pre-stores keywords and images representing harmful information. The analyzing unit 22 determines whether or not the data supplied via the extraction unit 11 includes a stored keyword and image. By doing so, the analyzing unit 22 determines whether or not any information harmful to the "child" is included in the supplied data. Then, the analyzing unit 22 outputs a determination result representing that harmful information is/is not included to the recording unit 12 together with the data supplied from the extraction unit 11.

The recording unit 12 records the data supplied from another communication apparatus, address information extracted by the extraction unit 11, and the determination result of the analyzing unit 22 in association with one another in the RAM 13, as shown in FIG. 8.

Likewise the first embodiment, the verification unit 14 controls the leading unit 16 in response to a confirmation request supplied from the input device 4, and determines whether or not any data addressed to a verified user is stored in the RAM 13.

However, in a case where a verified user is the "child", the verification unit 14 determines whether or not any harmful information is included in each stored data, by referring to each determination result of the analyzing unit 22 associated with each data. And the verification unit 14 does not treat data determined as including harmful information as data addressed to the "child", even if the data is actually addressed to the "child".

Likewise the first embodiment, the verification unit 14 notifies that any data addressed to a verified user is/is not stored in the RAM 13 to the verified user.

And likewise the first embodiment, in response to a read request supplied from the input device 4 in accordance with an operation of the verified user, the verification unit 14 instructs the reading unit 16 to read data addressed to the verified use. Thus, data addressed to the verified user is output from the communication apparatus 3 or from the television set 7.

As described above, the verification unit 14 does not treat any data that is addressed to the "child" and includes harmful information as data addressed to the "child". Therefore, existence of data addressed to the "child" and including harmful information is not notified to the "child". And the "child" cannot retrieve data including harmful information from the server 5C.

The structure and operations other than the above are substantially the same as those of the first embodiment and the second embodiment.

In a case where data addressed to the "child" and including harmful information is supplied, the verification unit 14 may notify the "father" or the "mother" that there is data addressed to the "child" and including harmful information, when the verification unit 14 notifies the "father" or the "mother" whether there is any data addressed to the "father" or the "mother". The verification unit 14 may urge the "father" or the "mother" to delete the data addressed to the "child" and including harmful information by outputting a predetermined message.

The server 5C may be structured so that the "father" or the "mother" can set whether or not the "child" is allowed to retrieve data including harmful information, or can set the age at which the "child" is allowed to retrieve data including harmful information. Settings made by the "father" or the "mother" are recorded in the memory 15 together with identification information of a user. By referring to the settings recorded in the memory 15, the verification unit 14 determines whether or not to supply data including harmful information to the "child". Then, the verification unit 14 notifies the "child" that there is/is not data for the child in accordance with a determination result.

Fourth Embodiment

A data communication system according to a fourth embodiment of the present invention will now be explained with reference to the drawings.

The data communication system according to the fourth embodiment prevents a "child" from seeing and listening to data including harmful information.

EXAMPLE 1

First, a case where a user sees and listens to data by using a computer (PC) 3C which serves as the communication apparatus 3 will be explained.

Figure 9:
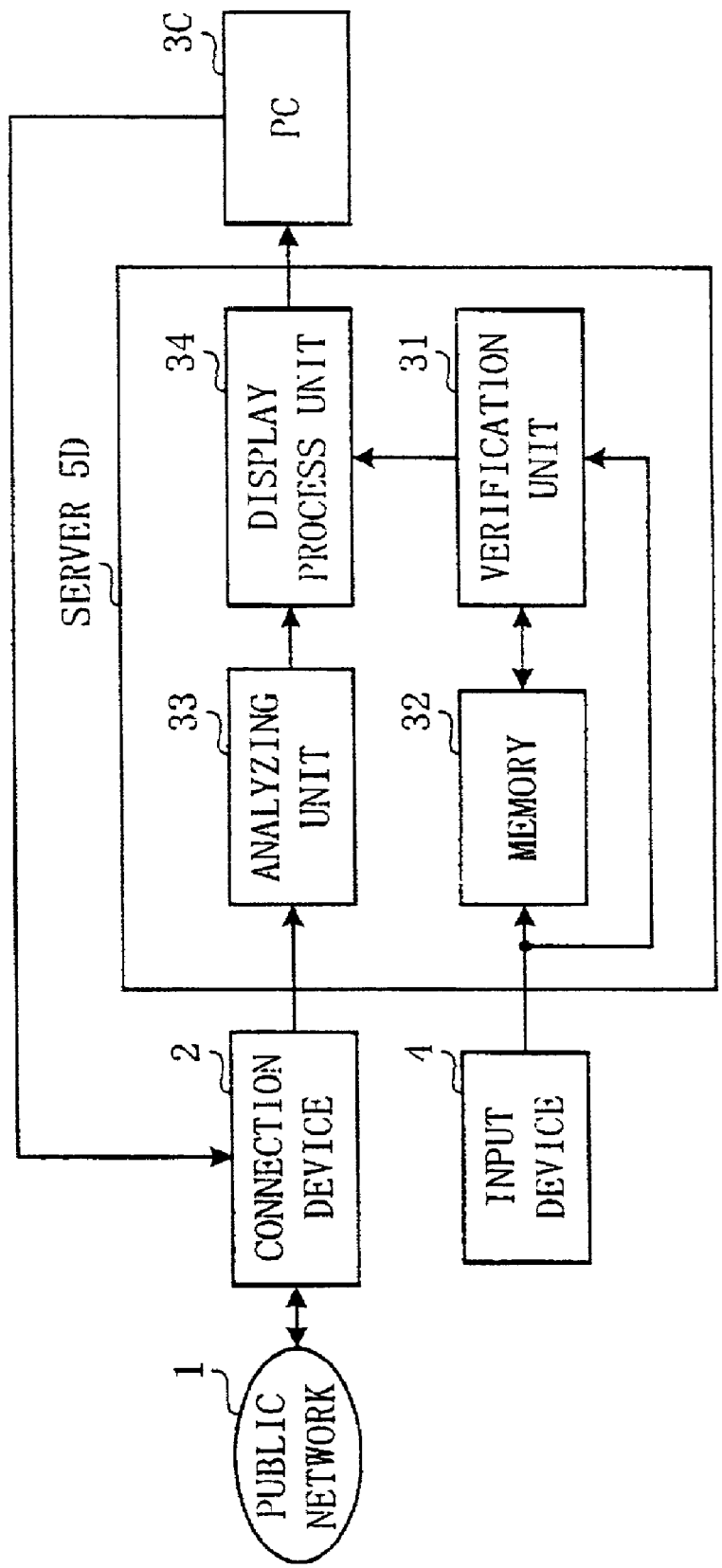
FIG. 9 is a block diagram showing a structure of a first example of a data communication system according to a fourth embodiment.

The data communication system comprises a public network 1, a connection device 2, a computer 3C, an input device 4, and a server 5D, as shown in FIG. 9.

The public network 1 and the connection device 2 are substantially the same as the above-described embodiments.

The computer 3C is used by a plurality of users. The computer 3C has a browser or the like for presenting data to a user. The computer 3C accesses another communication apparatus (such as a WWW server) via the public network 1 in accordance with a user's operation. Then, the computer 3C receives via the server 5D, data supplied from another communication apparatus, and presents the received data to the user by using the browser or the like.

The input device 4 is arranged near the computer 3C. The input device 4 acquires identification information of a user in accordance with a user's operation. Then, the input device 4 inputs the acquired identification information to the server 5D.

In response to turning on of the computer 3C, the input device 4 acquires verification information of the user who uses the computer 3C by the camera, the mike, or the like. Then, the input device 4 inputs the acquired verification information to the server 5D.

The server 5D stores the identification information of the user supplied from the input device 4. The server 5D verifies (identifies) the user by using the verification information supplied firm the input device 4, and the pre-stored identification information.

The server 5D supplies data sent from another communication apparatus via the public network 1 and the connection device 2 to the computer 3C. However, in a case where the verified user is a "child", the server 5D does not supply data that includes harmful information to the computer 3C.

As shown in FIG. 9, the server 5D comprises a verification unit 31, a memory 32, an analyzing unit 33, and a display process unit 34.

The verification unit 31 performs user registration and user verification, likewise the above described embodiments. In a case where a verified user is a "child", the verification unit 31 outputs to the display process unit 34, a prohibition signal for prohibiting the supply of data including harmful information.

The analyzing unit 33 pre-stores keywords and images representing harmful information. The analyzing unit 33 determines whether or not data supplied from another communication apparatus includes a stored keyword and image. By doing so, the analyzing unit 33 determines whether or not information harmful to the "child" is included in the supplied data. The analyzing unit 33 outputs a determination result representing that harmful information is/is not included to the display process unit 34 together with the supplied data.

The display process unit 34 outputs the data supplied via the analyzing unit 33 to the computer 3C. However, in response to a prohibition signal from the verification unit 31, the display process unit 34 does not output the data supplied from the analyzing unit 33 together with a determination result representing that harmful information is included to the computer 3C.

An operation of the data communication system in a case where the "child" retrieves data from another communication apparatus by operating the computer 3C will be explained.

Likewise the above described embodiments, the verification unit 31 of the server 5D registers each user of the computer 3C by storing verification information supplied from the input device 4 in the memory 32.

The "child" turns on the computer 3C, and accesses another communication apparatus (such as a WWW server) by operating the computer 3C.

The input device 4 acquires verification information of the "child" in response to the tuning on of the computer 3C, and inputs the acquired verification information to the server 5D. The verification unit 31 of the server 5D verifies the "child" by performing the same verification process as shown in FIG. 5 in response to the supply of the verification information from the input device 4.

In a case where a verified user is a "child", the verification unit 31 outputs a prohibition signal for prohibiting the supply of data including harmful information to the display process unit 34.

On the other hand, the computer 3C accesses another communication apparatus in response to an operation of the "child". The another communication apparatus outputs data in response to the access of the computer 3C.

The analyzing unit 33 of the server 5D determines whether or not the data supplied from the another communication apparatus via the public network 1 and the connection device 2 includes information harmful to the "child". Then, the analyzing unit 33 outputs a determination result representing that harmful information is/is not included to the display process unit 34 together with the supplied data.

In a case where the data is supplied together with a determination result that harmful information is not included, the display process unit 34 outputs the data supplied via the analyzing unit 33 to the computer 3C. Due to this, the "child" can see and listen to the data supplied from another communication apparatus on the computer 3C.

On the other hand, in a case where the data is supplied together with a determination result that harmful information is included, the display process unit 34 does not output the data supplied via the analyzing unit 33 to the computer 3C. Therefore, the "child" cannot see or listen to the data including the harmful information.

As described above, in a case where the verified user is a "child", data including harmful information is not supplied from the server 5D to the computer 3C. Thus, the "child" can be prevented from seeing and listening to data including harmful information.

EXAMPLE 2

Next, a case where a user sees and listens to data by the television set 7 will be explained.

Figure 10:
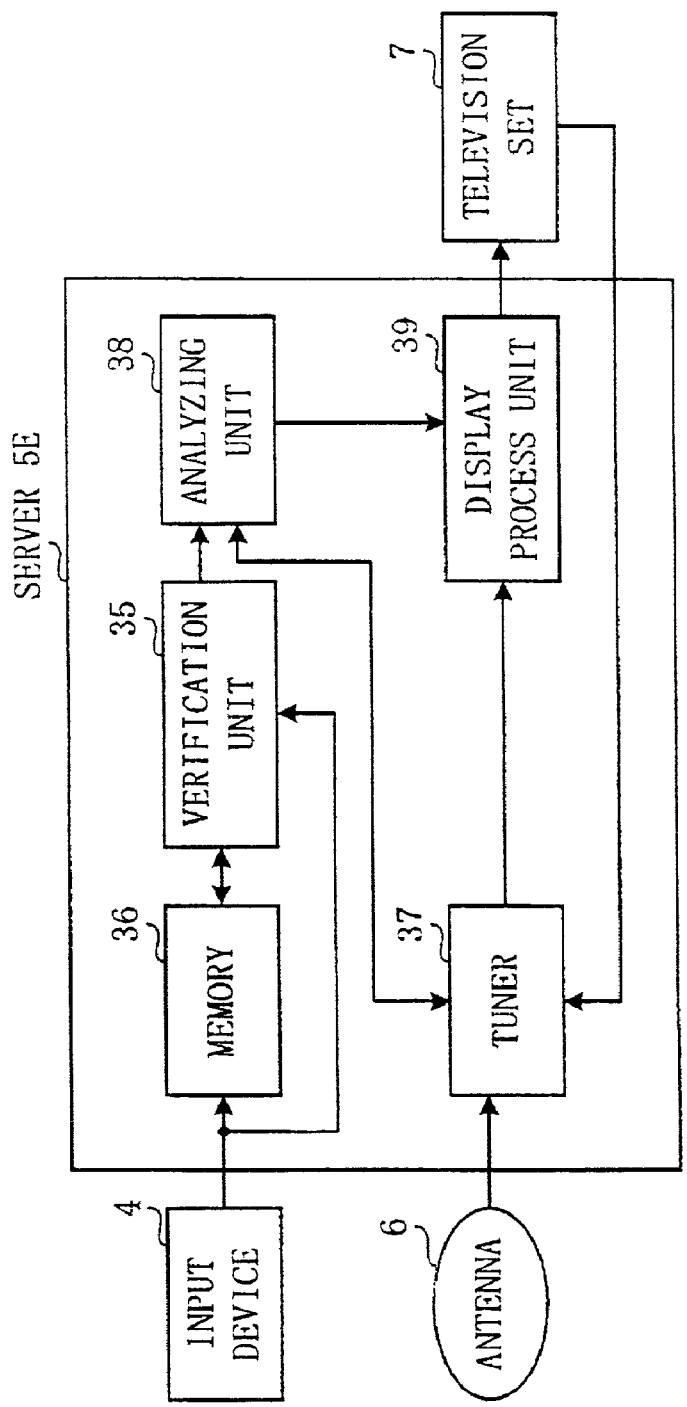
FIG. 10 is a block diagram showing a structure of a second example of the data communication system according to the fourth embodiment.

The data communication system comprises an input device 4, a server 5E, an antenna 6, and a television set 7, as shown in FIG. 10.

The antenna 6 and the television set 7 are substantially the same as those of the above described embodiments.

The input device 4 is substantially the same as the input device 4 of the Example 1 of the fourth embodiment.

The server 5E stores identification information of a user supplied from the input device 4. And the server 5E verifies (identifies) a user by using verification information supplied from the input device 4 and the pre-stored identification information.

The server 5E supplies data of a program supplied on an electric wave to the television set 7. However, in a case where the verified user is a "child", the server 5E does not supply data including harmful information to the television set 7.

The server 5E comprises a verification unit 35, a memory 36, a tuner 37, an analyzing unit 38, and a display process unit 39, as shown in FIG. 10.

The verification unit 35 performs user registration and user verification likewise the above described embodiments. In a case where a verified user is a "child", the verification unit 35 outputs a prohibition signal for prohibiting the supply of data including harmful information to the analyzing unit 38.

The tuner 37 selects an electric wave of a channel specified by a channel selection signal from the television set 7, from among electric waves received by the antenna 6. Then, the tuner 37 converts the selected electric wave into a video signal having an intermediate frequency, and outputs the video signal to the display process unit 39.

The analyzing unit 38 pre-stores keywords and images representing harmful information. The analyzing unit 38 acquires EPG (Electronic Program Guide) data included in the electric wave received by the antenna 6 via the tuner 37 in response to the prohibition signal from the verification unit 35. And the analyzing unit 38 identifies the channel selected by the tuner 37.

The analyzing unit 38 specifies a program displayed on the television set 7 based on the acquired EPG data and a result of identifying the channel. And the analyzing unit 38 determines whether a stored keyword and image are included in the data of the specified program included in the EPG data or not. By doing so, the analyzing unit 38 determines whether or not harmful information is included in the program displayed on the television set 7. In a case where it is determined that harmful information is included, the analyzing unit 38 outputs to the display process unit 39, a stop signal for instructing the stop of outputting the display data.

The display process unit 39 converts a form of the data supplied from the tuner 37 into a form in which the data can be displayed on the television set 7, and outputs the data to the television set 7 as display data. And the display process unit 39 pre-stores a message for rejecting the display of a program such as "this program cannot be displayed".

The display process unit 39 stops the output of display data in response to the stop signal supplied from the analyzing unit 38, and outputs the pre-stored message to the television set 7. Due to this, the message for rejecting the display of the program is output from the television set 7.

An operation of the data communication system in a case where a "child" watches a television program on the television set 7 will be explained.

The verification unit 35 of the server 5E registers each user of the television set 7 by storing identification information of each user supplied from the input device 4 in the memory 36, likewise the above described embodiments.

The "child" turns on the power of the television set 7, and selects a channel.

When the power of the television set 7 is turned on, the an electric wave received by the antenna 6 goes through the tuner 37 and the display process unit 39, and is supplied to the television set 7 as display data. Due to this, a program of a selected channel is displayed on the television set 7.

In response to the turning on of the television set 7, the input device 4 acquires verification information of the "child", and inputs the verification information to the server 5E. The verification unit 35 of the server 5E verifies the "child" by performing the same verification process as shown in FIG. 5 in response to the verification information supplied from the input device 4

In a case where the verified user is a "child", the verification unit 35 outputs a prohibition signal for prohibiting the supply of data including harmful information to the analyzing unit 38.

In response to the prohibition signal from the verification unit 35, the analyzing unit 38 acquires EPG data from the tuner 37, and identifies a selected channel.

The analyzing unit 38 specifies a program displayed on the television set 7 from the acquired EPG data and the result of identifying the channel. Then, the analyzing unit 38 determines whether or not the specified program includes harmful information.

In a case where it is determined that harmful information is included, the analyzing unit 38 outputs to the display process unit 39, a stop signal for instructing the stop of outputting display data.

The display process unit 39 stops outputting the display data in response to the stop signal from the analyzing unit 38, and outputs the pre-stored message to the television set 7. Due to this, a message (such as "this program cannot be displayed") for rejecting the display of the program is output from the television set 7.

As described above, in a case where the verified user is a "child", data including harmful information is not supplied from the server 5E to the television set 7. Therefore, the "child" can be prevented from seeing and listening to a program including harmful information.

Fifth Embodiment

A data communication system according to a fifth embodiment of the present invention will now be explained with reference to the drawings.

The data communication system according to the fifth embodiment previously detects a time and a channel at which and by which a program including harmful information is broadcast by using EPG data, and prevents a "child" from seeing and listening to a program including harmful information.

Figure 11:
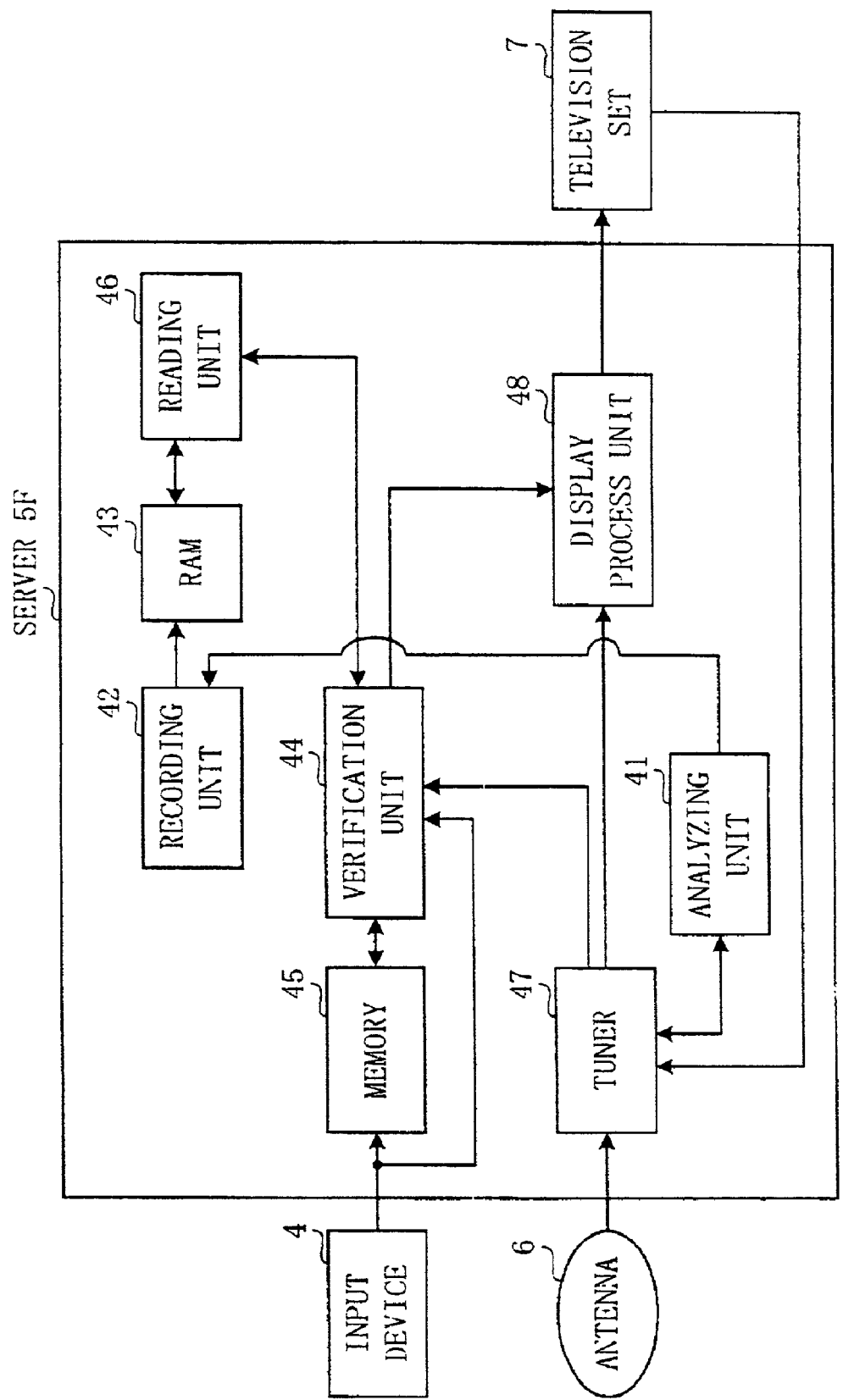
FIG. 11 is a block diagram showing a structure of a data communication system according to a fifth embodiment.

The data communication system comprises an input device 4, a server 5F, an antenna 6, and a television set 7, as shown in FIG. 11.

The input device 4, the antenna 6, and the television set 7 are substantially the same as those of the Example 2 of the fourth embodiment.

The server 5F comprises an analyzing unit 41, a recording unit 42, a RAM 43, a verification unit 44, a memory 45, a reading unit 46, a tuner 47, and a display process unit 48, as shown in FIG. 11.

The analyzing unit 41 pre-stores keywords and images representing harmful information. The analyzing unit 41 acquires EPG data via the tuner 47 at every predetermined interval (for example, every week). Then, the analyzing unit 41 detects a program including a stored keyword and image from the programs to be broadcast in a predetermined period (for example, in a week) by using the acquired EPG data. Due to this, the analyzing unit 41 detects a harmful program including harmful information. The analyzing unit 41 outputs information regarding the detected harmful program (such as the broadcast time, the channel, and the like) to the recording unit 42.

The recording unit 42 records the information regarding the harmful program supplied from the analyzing unit 41 in the RAM 43.

The verification unit 44 performs user registration and user verification likewise the above described embodiments. In a case where a verified user is a "child", the verification unit 44 controls the reading unit 46, and retrieves the information regarding the harmful program stored in the RAM 43. And the verification unit 44 controls the tuner 47, and identifies a channel selected by the tuner 47.

The verification unit 44 determines whether or not a program displayed on the television set 7 is a harmful program based on the retrieved information regarding the harmful information, and a result of identifying the channel. In a case where it is determined that the displayed program is a harmful program, the verification unit 44 outputs a stop signal for instructing the stop of supplying the display data to the display process unit 48.

The tuner 47 selects an electric wave of a channel specified by a channel selection signal from the television set 7 from among electric waves received by the antenna 6. Then, the tuner 47 converts the selected electric wave into a video signal having an intermediate frequency, and outputs the video signal to the display process unit 48.

The display process unit 48 converts a video signal supplied from the tuner 47 into a signal which can be displayed on the television set 7, and outputs the signal to the television set 7 as display data. And the display process unit 48 pre-stores a message for rejecting the display of a program (such as "this program cannot be displayed").

The display process unit 48 stops outputting display data in response to a stop signal supplied from the verification unit 44, and outputs the pre-stored message to the television set 7. Thus, a message for rejecting the display of a program is output from the television set 7.

An operation of the data communication systems in a case where a "child" watches a television program on the television set 7 will be explained.

The analyzing unit 41 acquires EPG data via the tuner 47 at every predetermined interval. Then, the analyzing unit 41 detects a harmful program which is to be broadcast in a predetermined period by using the acquired EPG data.

The analyzing unit 41 outputs information regarding the detected harmful program (broadcast time, the channel, and the like) to the recording unit 42. The recording unit 42 records the information regarding the harmful program supplied from the analyzing unit 41 in the RAM 43.

Thus, the information regarding the harmful program which is to be broadcast in a predetermined period is previously stored in the RAM 43.

When a "child" turns on the power of the television set 7, a program of a channel selected by the "child" is displayed on the television set 7, likewise the above described embodiments. And the verification unit 44 verifies the "child" by using verification information acquired by the input device 4.

In a case where the verified user is a "child", the verification unit 44 controls the reading unit 46, and retrieves the information regarding the harmful program stored in the RAM 43. And the verification unit 44 controls the tuner 47, and identifies the channel selected by the tuner 47.

The verification unit 44 determines whether a program displayed on the television set 7 is a harmful program or not based on the retrieved information regarding the harmful program and a result of identifying the channel.

In a case where it is determined that the displayed program is a harmful program, the verification unit 44 outputs a stop signal for instructing the stop of supplying the display data to the display process unit 48.

The display process unit 48 stops supplying the display data in response to the stop signal supplied from the verification unit 44, and outputs the pre-stored message to the television set 7. Thus, a message for rejecting the display of the program is output from the television set 7.

As described above, since a harmful program is previously detected by using the EPG data, it is possible to efficiently prevent the "child" from seeing and listening to a program including harmful information.

In a case where EPG data which is supplied on an electric wave cannot be received, information regarding programs to he broadcast in a predetermined period may be retrieved via a communication network. In this case, the server 5F is structured as shown in FIG. 12, for example.

Figure 12:
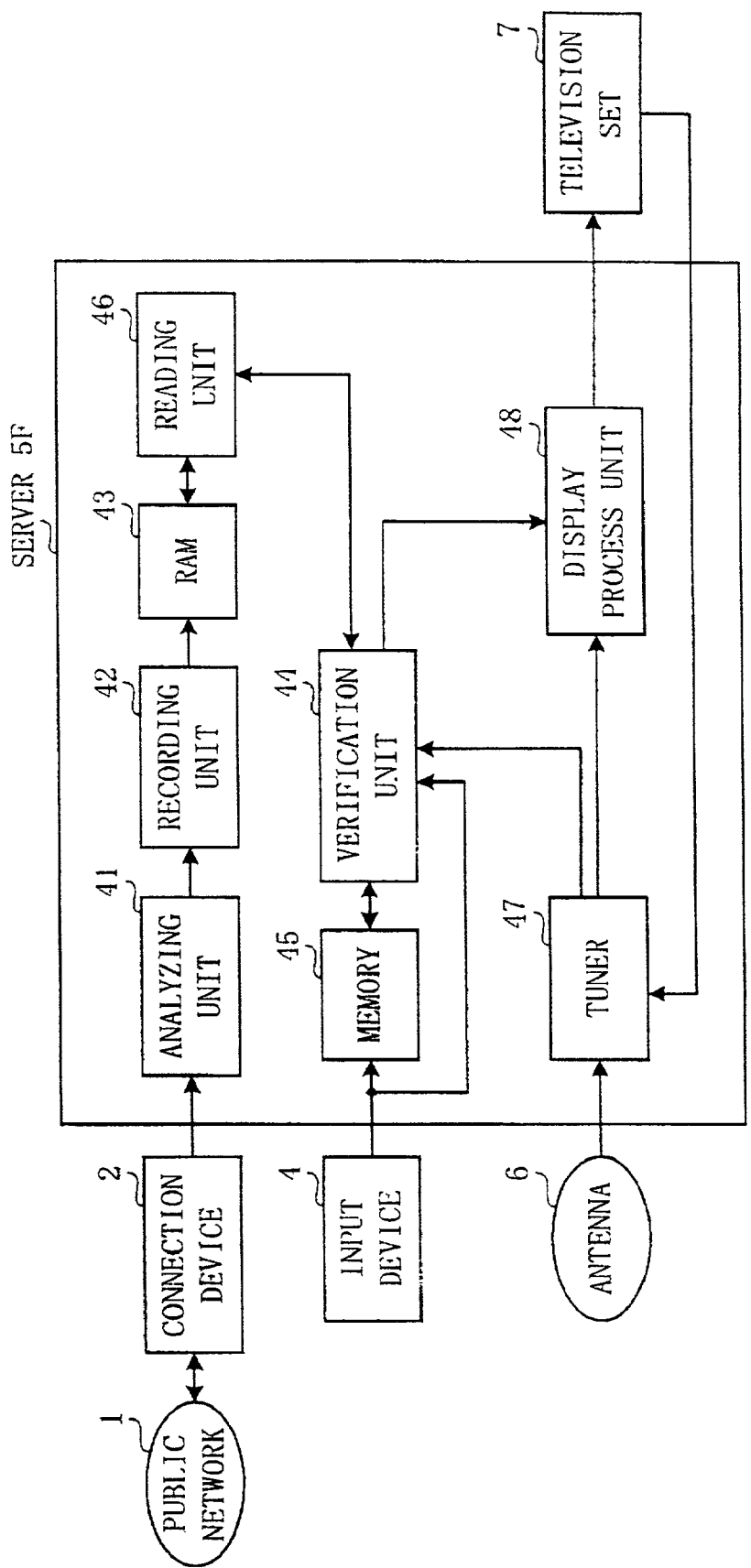
FIG. 12 is a diagram showing another structure of the data communication system according to the fifth embodiment.

As shown in FIG. 12, the analyzing unit 41 retrieves information regarding programs to be broadcast in a predetermined period from another communication apparatus via the public network 1 and the connection device 2. Then, likewise the above, the analyzing unit 41 detects a program which includes stored keyword or image from the programs to be broadcast in the predetermined period by using the retrieved information. Thus, the analyzing unit 41 detects a harmful program which is to be broadcast in the predetermined period. Then, the analyzing unit 41 outputs information regarding the harmful program (such as the broadcast time, the channel, and the like) to the recording unit 42.

With such the structure, a harmful program can he previously detected even if EPG data supplied on an electric wave cannot be obtained.

Sixth Embodiment

A data communication system according to a sixth embodiment of the present invention will now be explained with reference to the drawings.

In a case where the user is a "child", the data communication system according to the sixth embodiment applies a predetermined process to harmful information included in data to mask the harmful information. Therefore, the "child" is prevented from seeing and listening to the harmful information.

Figure 13:
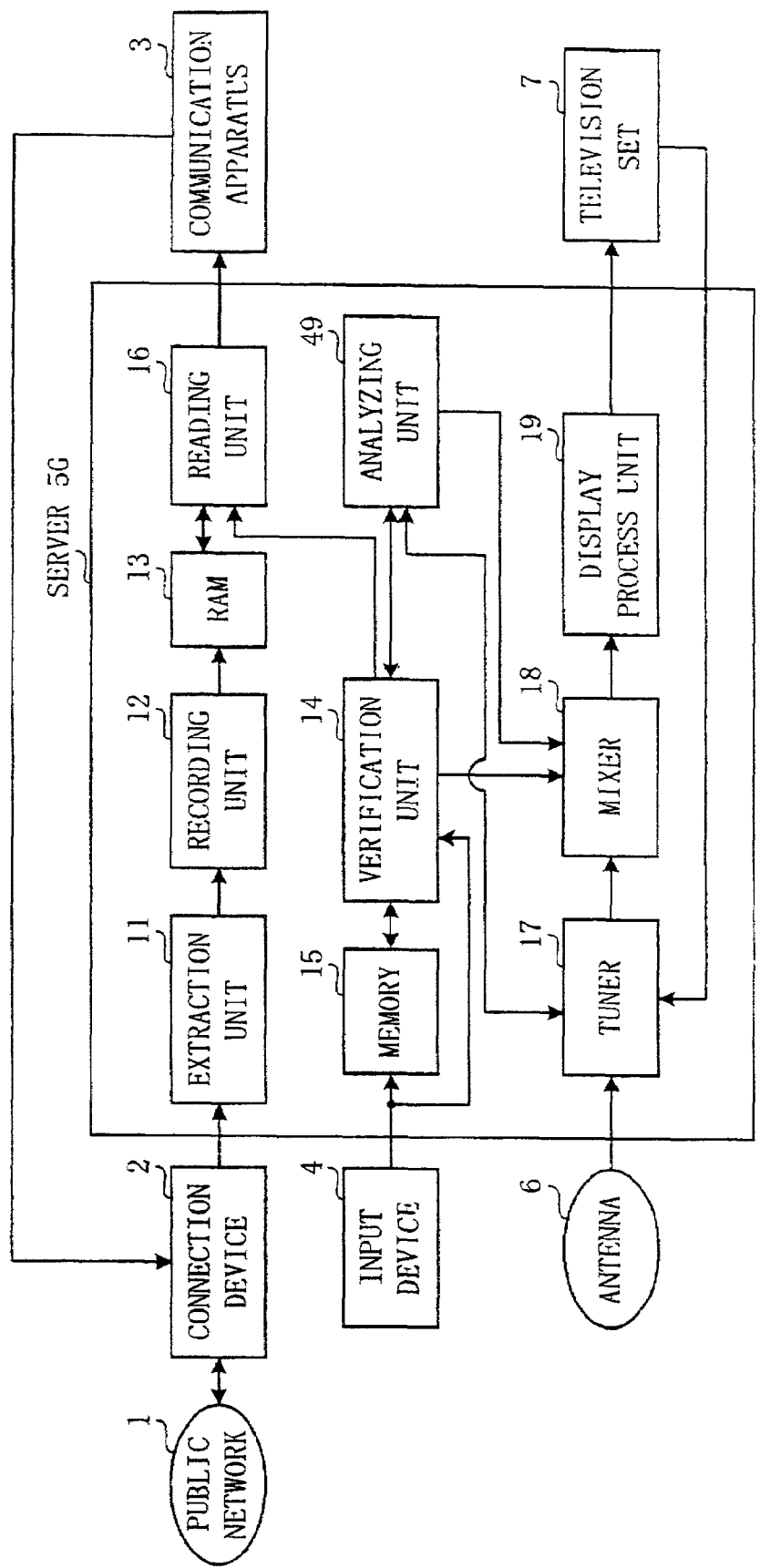
FIG. 13 is a block diagram showing a structure of a data communication system according to a sixth embodiment.

The data communication system comprises a public network 1, a connection device 2, a communication apparatus 3, an input device 4, a server 5G, an antenna 6, and a television set 7, as shown in FIG. 13.

The public network 1, the connection device 2, the communication apparatus 3, the input device 4, the antenna 6, and the television set 7 are substantially the same as those of the first embodiment.

The server 5G comprises an analyzing unit 49 in addition to the structure of the server 5A of the first embodiment.

The verification unit 14 performs user registration and user verification likewise the above described embodiments. In a case where a verified user is a "child", the verification unit 14 outputs a process signal for instructing the application of a process to harmful information to the analyzing unit 49.

The analyzing unit 49 applies a predetermined process to harmful information included in data addressed to the "child" which is stored in the RAM 13, and/or data of a program displayed on the television set 7 in response to the process signal from the verification unit 14.

Specifically, the analyzing unit 49 pre-stores keywords and images representing harmful information. In response to the process signal, the analyzing unit 49 controls the reading unit 16 to retrieve data addressed to the "child" from the RAM 13. Or, in response to the process signal, the analyzing unit 49 retrieves the data of the television program via the tuner 17.

Then, the analyzing unit 49 detects data (harmful information) which corresponds to a stored keyword and image from the retrieved data. In a case where any harmful information is detected, the analyzing unit 49 applies a predetermined process to the detected data. Due to this, the harmful information is masked. For example, in a case where a gun is set as harmful information, if a scene wherein a gun is used appears, the data portion representing the gun is masked.

Then, the analyzing unit 49 outputs the data including the masked harmful portion to the communication apparatus 3 via the reading unit 16 or to the mixer 18.

The structure and operations other than the above are substantially the same as those of the first embodiment.

In a case where the user is a "child", the harmful information included in the data is processed in the way described above. Thus, the "child" can be prevented from seeing and listening to the harmful information.

A time and a channel at which ad via which a program including harmful information is broadcast may be previously detected with the use of EPG data, likewise the fifth embodiment. By this previous detection, harmful information can be efficiently processed in a case where the "child" changes channels, and as a result, a program including harmful information is displayed on the television set 7.

Seventh Embodiment

A data communication system according to a seventh embodiment of the present invention will now be explained with reference to the drawings.

The data communication system according to the seventh embodiment regularly downloads and stores latest data from a WWW server which each user accesses by operating a computer 3C. And in response to a request from each user, the data communication system provides the stored latest data to each user via the computer 3C.

Figure 14:
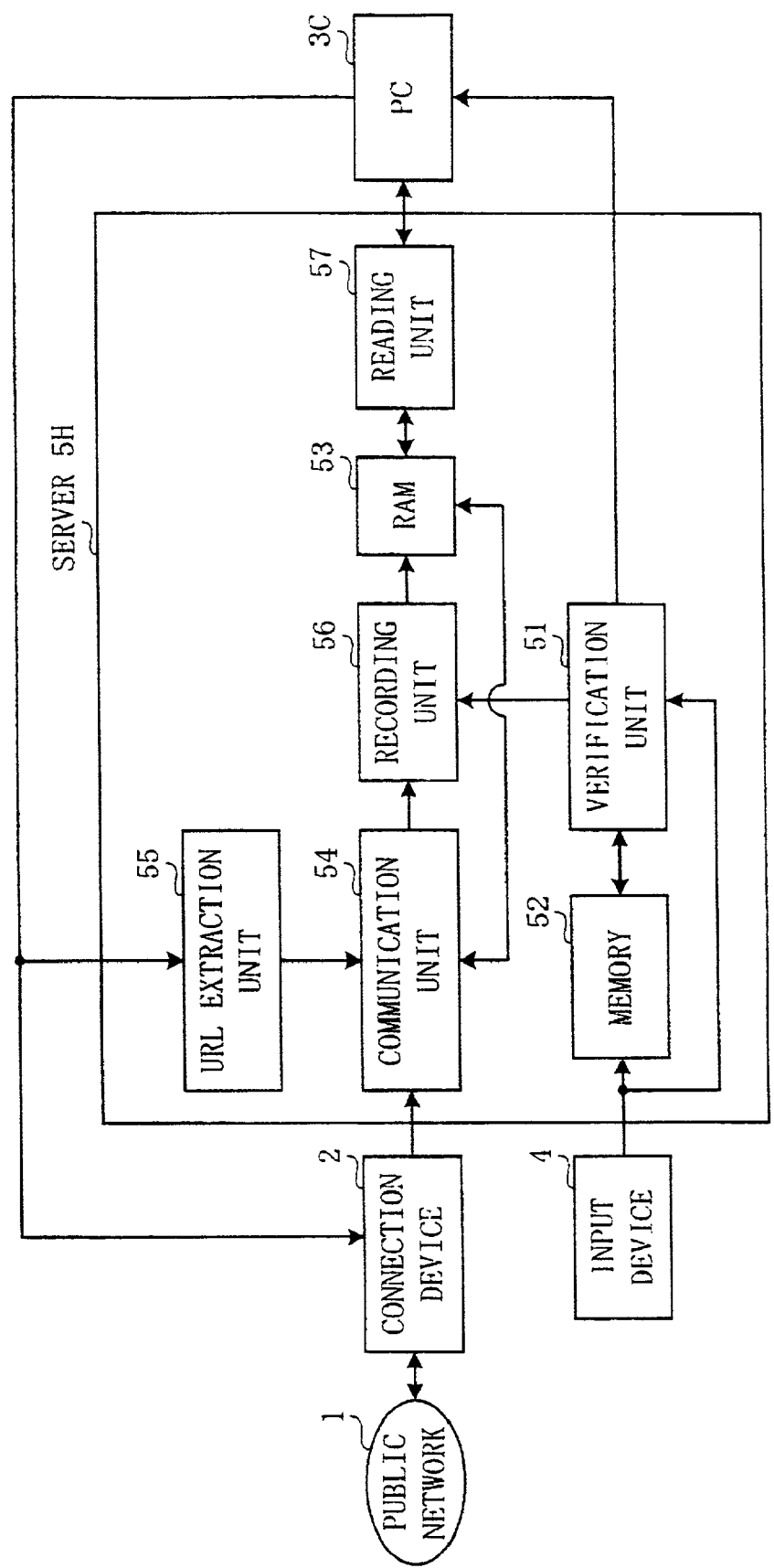
FIG. 14 is a block diagram showing a structure of a data communication system according to a seventh embodiment.

The data communication system comprises a public network 1, a connection device 2, a computer 3C, an input device 4, and a server 5H, as shown in FIG. 14.

The public network 1, the connection device 2, and the input device 4 are substantially the same as those of the above described embodiments.

The computer 3C is used by a plurality of users. The computer 3C has a browser or the like to present data to a user. In response to a user' operation, the computer 3C downloads data from a WWW server designated by the user, and presents the data to the user by the browser or the like.

The computer 3C is provided with information regarding a user who is verified by the server 5H, that is, information regarding the user who operates the computer 3C from the server 5H. And the computer 3C instructs the server 5H to provide latest data in response to a user's operation. Specifically, in response to a user's operation, the computer 3C outputs a read request signal together with the information regarding the user supplied from the server 5H to the server 5H. Thus, the computer 3C retrieves latest data provided by a WWW server which the user has once accessed from the server 5H. Then, the computer 3C presents the latest data retrieved from the server 5H to the user by the browser or the like.

The server 5H comprises a verification unit 51, a memory 52, a RAM 53, a communication unit 54, a URL extraction unit 55, a recording unit 56, and a reading unit 57, as shown in FIG. 14.

The verification unit 51 stores identification information supplied from the input device 4 in the memory 52 likewise the above described embodiments. The verification unit 51 verifies a user by using verification information supplied from the input device 4 and the identification information stored in the memory 52. And the verification unit 51 outputs information representing a verified user to the recording unit 56 and to the computer 3C.

The RAM 53 stores information representing each user and a URL (Uniform Resource Locator) of a WWW server (a homepage) which each user has accessed in association with each other, as shown in FIG. 15A. And the RAM 53 stores information representing each user and latest data provided by the WWW server which each user has accessed in association with each other, as shown in FIG. 15B.

The communication unit 54 retrieves a URL of a homepage which each user has accessed from the RAM 53 at every predetermined interval (for example, every week). The communication unit 54 accesses the homepage specified by the retrieved URL via the public network 1 and the connection device 2, and downloads latest data from the accessed homepage. Then, the communication unit 54 outputs the downloaded data to the recording unit 56.

The URL extraction unit 55 extracts a URL of a homepage which each user accesses from a signal output by the computer 3C. Then, the URL extraction unit 55 outputs the extracted URL to the recording unit 56 via the communication unit 54.

The recording unit 56 records the information representing each user supplied from the verification unit 51, the latest data supplied from the communication unit 54, and the URL supplied from the URL extraction unit 55 in association with one another in the RAM 53.

In response to a read request signal supplied from the computer 3C, the reading unit 57 specifies a user based on the information representing each user supplied with the read request signal. The reading unit 57 determines whether or not there is any latest data stored in the RAM 53 that is associated with information representing the specified user. In a case where it is determined that there is latest data stored, the reading unit 57 reads the latest data associated with the information representing the specified user from the RAM 53, and outputs the read latest data to the computer 3C.

An operation of the data communication system will now be explained.

The verification unit 51 of the server 5H registers each user of the computer 3C likewise the above described embodiments.

Each user turns on the computer 3C, and inputs a URL for specifying a homepage to be accessed to the computer 3C.

In response to the turning on of the computer 3C, the input device 4 acquires verification information of the user and inputs the verification information to the server 5H.

The verification unit 51 of the server 5H verifies the user by using the verification information supplied from the input device 4 and the identification information stored in the memory 52. Then, the verification unit 51 outputs information representing the verified user to the recording unit 56.

The computer 3C accesses the homepage specified by the URL input by the user, and downloads data. Then, the computer 3C presents the downloaded data to the user by the browser or the like.

At this time, the URL extraction unit 55 of the server 5H extracts the URL specifying the homepage accessed by the computer 3C from a signal output by the computer 3C.

Then, the URL extraction unit 55 outputs the extracted URL to the recording unit 56 via the communication unit 54.

The recording unit 56 records the information representing the user supplied from the verification unit 51 and the URL supplied from the URL extraction unit 55 in association with each other in the RAM 53.

The communication unit 54 retrieves the URL of the homepage accessed by each user from the RAM 53 at every predetermined interval.

Then, the communication unit 54 downloads latest data from the homepage specified by the retrieved URL, and outputs the latest data to the recording unit 56.

The recording unit 56 records each latest data supplied from the communication unit 54 in association with the information representing each user in the RAM 53.

Each user can retrieve latest data without accessing the WWW server, by operating the computer 3C with predetermined procedures.

In response to the user's operation, the computer 3C outputs a read request signal together with the information representing the user supplied from the server 5H to the server 5H.

In response to the read request signal supplied from the computer 3C, the reading unit 57 of the server 5H determines whether or not there is any latest data stored in the RAM 53 that is associated with the information representing the user supplied with the read request signal.

In a case where it is determined that there is latest data stored, the reading unit 57 reads the latest data associated with the supplied information representing the user from the RAM 53, and outputs the latest data to the computer 3C.

The computer 3C presents the latest data supplied from the server 5H to the user by the browser or the like.

As described above, once each user accesses a WWW server, he/she can see and listen to the latest data provided by the WWW server without accessing the WWW server from the next time.

Eighth Embodiment

A data communication system according to an eighth embodiment of the present invention will now be explained with reference to the drawings.

The data communication system according to the eighth embodiment determines each user's preference, and notifies each user of information regarding television programs which suit the determined user's preference (such as the broadcasting dates and times, the channels, and the brief outlines of the programs).

Figure 16:
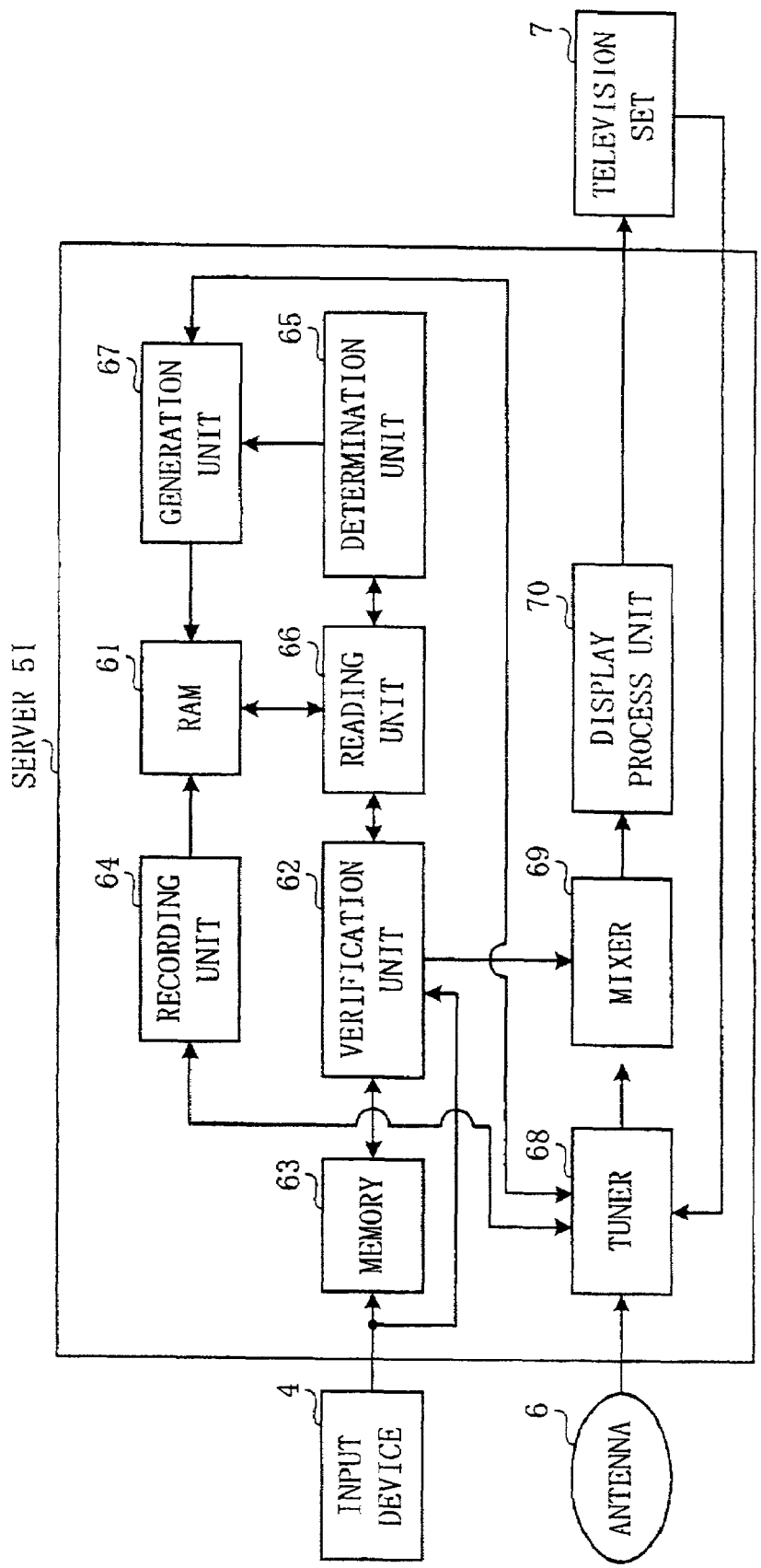
FIG. 16 is a block diagram showing a structure of a data communication system according to an eighth embodiment.

The data communication system comprises an input device 4, a server 5I, an antenna 6, and a television set 7, as shown in FIG. 16.

The antenna 6 and the television set 7 are substantially the same as those of the above described embodiments.

The input device 4 is arranged near the television set 7. The input device 4, acquires identification information of a user in accordance with a user's operation. Then, the input device 4 inputs the acquired identification information to the server 5I.

The input device 4 acquires verification information of a user in response to turning on of the television set 7, and changing of channels of the television set 7. Then, the input device 4 inputs the acquired verification information to the server 5I.

The server 5I stores the identification information of the user supplied from the input device 4. And the server 5I verifies (identifies) the user by using the verification information supplied from the input device 4 and the pre-stored identification information.

The server 5I determines each user's preference based on information regarding programs which each user has watched and listened to, and presents information regarding programs which suits each user's preference to each user.

The server 5I comprises a RAM 61, a verification unit 62, a memory 63, a recording unit 64, a determination unit 65, a reading unit 66, a generation unit 67, a toner 68, a mixer 69, and a display process unit 70, as shown in FIG. 16.

The RAM 61 stores information (title, cast, brief outline, and the like) regarding programs which each user has watched and listened to (hereinafter, referred to as "watched program"), and information (broadcasting date and time, channel, brief outline, and the like) regarding programs which suit each user's preference (hereinafter, referred to as "recommended program").

As shown in FIG. 17A, the information of watched programs is associated with information representing each user and is stored in the RAM 61 as log information. The information of recommended programs is associated with information representing each user as shown in FIG. 17B, and is stored in the RAM 61 as pre-announcement information.

The verification unit 62 performs user registration and user verification likewise the above described embodiments. The verification unit 62 outputs information representing a verified user to the recording unit 64. The verification unit 62 controls the reading unit 66 to retrieve pre-announcement information from the RAM 61. Then, the verification unit 62 extracts information of recommended programs to be presented to the user from the retrieved pre-announcement information, and outputs the extracted information to the mixer 69.

The recording unit 64 acquires EPG data from the tuner 68 in response to the information representing the user supplied from the verification unit 62, and identifies a channel selected by the tuner 68. And the recording unit 64 specifies a program which the user watches and listens to by using the retrieved EPG data and a result of identifying the channel. The recording unit 64 extracts information regarding the specified program from the EPG data. And the recording unit 64 records the supplied information representing the user and the extracted information regarding the watched program in association with each other in the RAM 61 as log information.

The determination unit 65 retrieves the log information from the RAM 61 by controlling the reading unit 66 at every predetermined interval (for example, every week, or every month). The determination unit 65 comprehensively determines each user's preference with the use of the retrieved log information in a way described later. Then, the determination unit 65 outputs a determination result to the generation unit 67.

The reading unit 66 reads each user's log information stored in the RAM 61 in accordance with the control of the determination unit 65, and outputs the log information to the determination unit 65. The reading unit 66 reads pre-announcement information stored in the RAM 61 in accordance with the control of the verification unit 62, and outputs the pre-announcement information to the verification unit 62.

The generation unit 67 retrieves EPG data via the tuner 68 in accordance with a determination result supplied from the determination unit 65. The generation unit 67 searches for recommended programs which suit each user's preference among the programs to be broadcast in a predetermined period (for example, in a week, or in a month) by using the determination result and the EPG data. Then, the generation unit 67 associates the information representing the user with the information of the recommended programs which are found out by search, and stores them in the in the RAM 61 as pre-announcement information.

The tuner 68 selects an electric wave of a channel specified by a channel selection signal supplied from the television set 7, from among electric waves received by the antenna 6. Then, the tuner 68 converts the selected electric wave into a video signal having a intermediate frequency, and outputs the vide signal to the mixer 69

The mixer 69 synthesizes the information of recommended programs supplied from the verification unit 62 with the video signal supplied from the tuner 68. Then, the mixer 69 outputs the synthesized signal (data) to the display process unit 70.

The display process unit 70 converts a form of the data supplied from the mixer 69 into a form in which the data can be displayed on the television set 7, and outputs the data to the television set 7 as display data, likewise the above described embodiments.

An operation of the data communication system will now be explained.

The verification unit 62 of the server 5I registers each user of the television set 7 likewise the above described embodiments.

A user turns on the television set 7, and selects a channel.

When the television set 7 is turned on, an electric wave received by the antenna 6 goes through the tuner 68, the mixer 69, and the display process unit 70, and is supplied to the television set 7 as display data. Thus, a program of the selected channel is displayed on the television set 7.

The input device 4 acquires verification information of the user in response to the turning on of the television set 7, and inputs the acquired verification information to the server 5I.

And the input device 4 acquires verification information of the user in response to change of channels by the user, and input the verification information to the server 5I.

In response to the verification information supplied from the input device 4, the verification unit 62 of the server 5I verifies the user by performing the same verification process as shown in FIG. 5. Then, the verification unit 62 outputs information representing the verified user to the recording unit 64.

The recording unit 64 acquires EPG data from the tuner 68 in response to the information representing the user supplied from the verification unit 62, and identifies a channel selected by the tuner 68.

The recording unit 64 specifies a program watched by the user by using the acquired EPG data and a result of identifying the channel.

Then, the recording unit 64 extracts information of the specified program from the EPG data, and records the extracted information in association with the information representing the user supplied from the verification unit 62 in the RAM 61 as log information.

Through this process, the information regarding programs watched by each user is stored in the RAM 61.

The determination unit 65 retrieves the log information stored in the RAM 61 at every predetermined interval by controlling the reading unit 66.

The determination unit 65 extracts keywords and the like representing the user's preference from the information regarding watched programs included in the retrieved log information, and sorts the extracted keywords from a keyword most often extracted to the less. In this way, the determination unit 65 determines each user's preference comprehensively.

The determination unit 65 outputs a determination result (keywords and the like representing each user's preference) to the generation unit 67.

The generation unit 67 acquires EPG data via the tuner 68 in response to the determination result supplied from the determination unit 65.

Then, the generation unit 67 searches for programs which suit each user's preference from programs to be broadcast in a predetermined period by using the determination result and the EPG data. Specifically, the generation unit 67 detects a program which includes a keyword representing each user's preference in a predetermined number or more, as a program which suits the user's preference.

Then, the generation unit 67 stores the information representing each user and information regarding detected programs in association with each other in the RAM 61 as pre-announcement information.

Thus, programs which suit each user's preference are searched out based on information regarding programs which each user has watched.

The verification unit 62 verifies each user in response to the verification information supplied from the input device 4, and also controls the reading unit 66 to retrieve the pre-announcement information stored in the RAM 61.

Then, the verification unit 62 extracts information regarding recommended programs to be presented to the verified user from the retrieved pre-announcement information.

Then, the verification unit 62 outputs the extracted information regarding the recommended programs to the mixer 69 a predetermined time before (for example, five minutes before) the recommended programs start.

The information regarding the recommended programs is synthesized with a video signal by the mixer 69, and converted into display data by the display process unit 70, and then supplied to the television set 7.

Thus, the information (broadcast time, channel, brief outline, and the like) regarding programs which suit the preference of the user who watches a television program on the television set 7 is displayed on the television set 7.

In a case where the EPG data supplied on an electric wave cannot be received, information regarding programs to be broadcast in a predetermined period may be retrieved via a communication network. In this case, the data communication system is structured as shown in FIG. 18.

Figure 18:
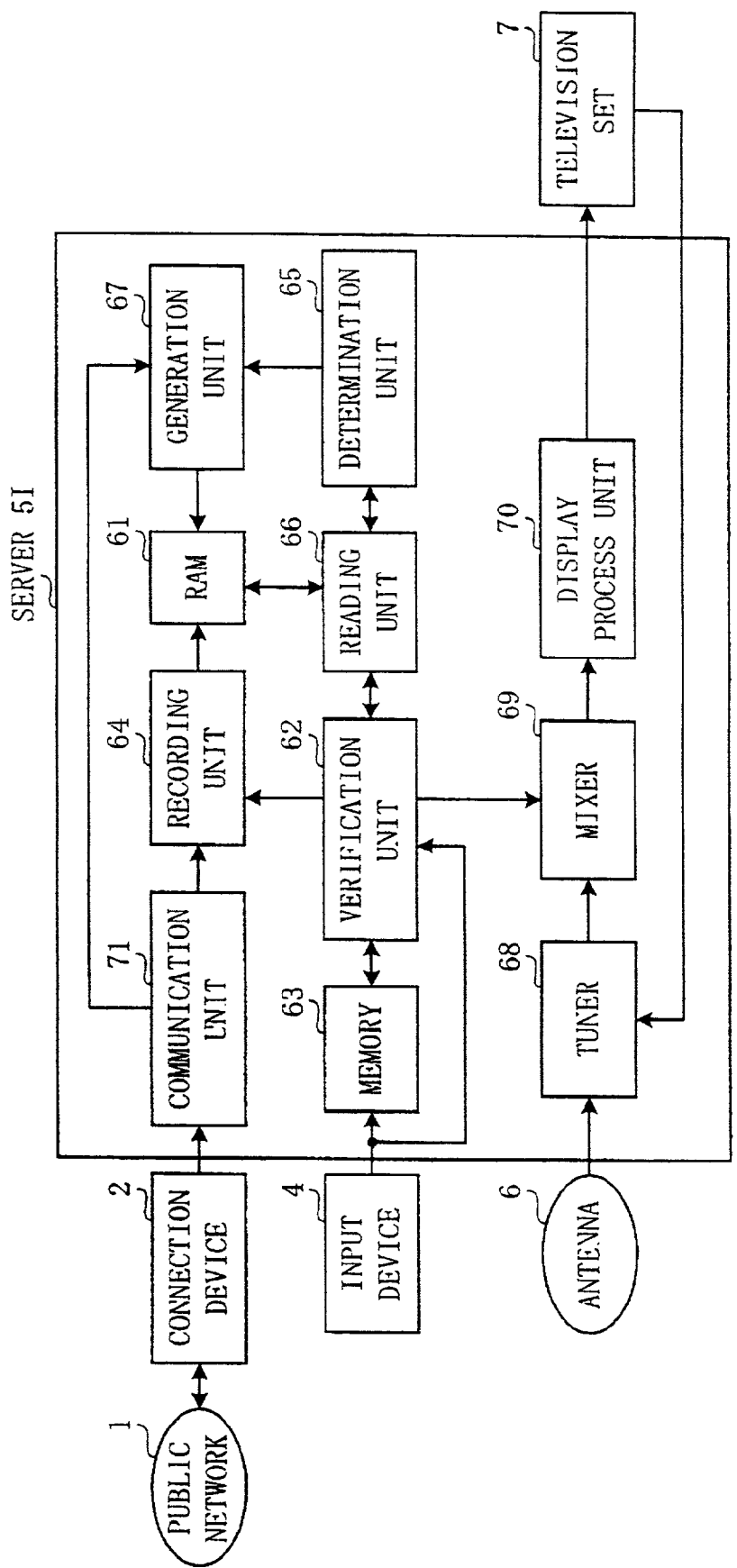
FIG. 18 is a diagram showing another structure of the data communication system according to the eighth embodiment.

As shown in FIG. 18, the server 5I comprises a communication unit 71 in addition to the structure shown in FIG. 16.

The communication unit 71 retrieves information regarding various programs from a WWW server operated by each television broadcasting station via the public network 1 and the connection device 2. Then, the communication unit 71 outputs the retrieved information (broadcasting date and time, channel, brief outline, and the like) regarding programs to the recording unit 64 and to the generation unit 67.

The recording unit 64 identifies a program which a user watches by using the information regarding programs supplied from the communication unit 71, and records log information in the RAM 61.

The generation unit 67 searches for recommended programs which suit each user's preference by using the information regarding programs supplied from the communication unit 71, and records pre-announcement information in the RAM 61.

Even if EPG data supplied on an electric wave cannot be acquired, information regarding programs which suit the preference of the user who watches a television program on the television set 7 can be presented to the user with this structure.

Ninth Embodiment

A data communication system according to a ninth embodiment of the present invention will now be explained with reference to the drawings.

The data communication system according to the ninth embodiment presents information regarding a recommended program to each user as well as the eighth embodiment, and also turns on a television set 7 at a start time of the recommended program and adjust the television to a channel on which the recommended program is broadcast.

Figure 19:
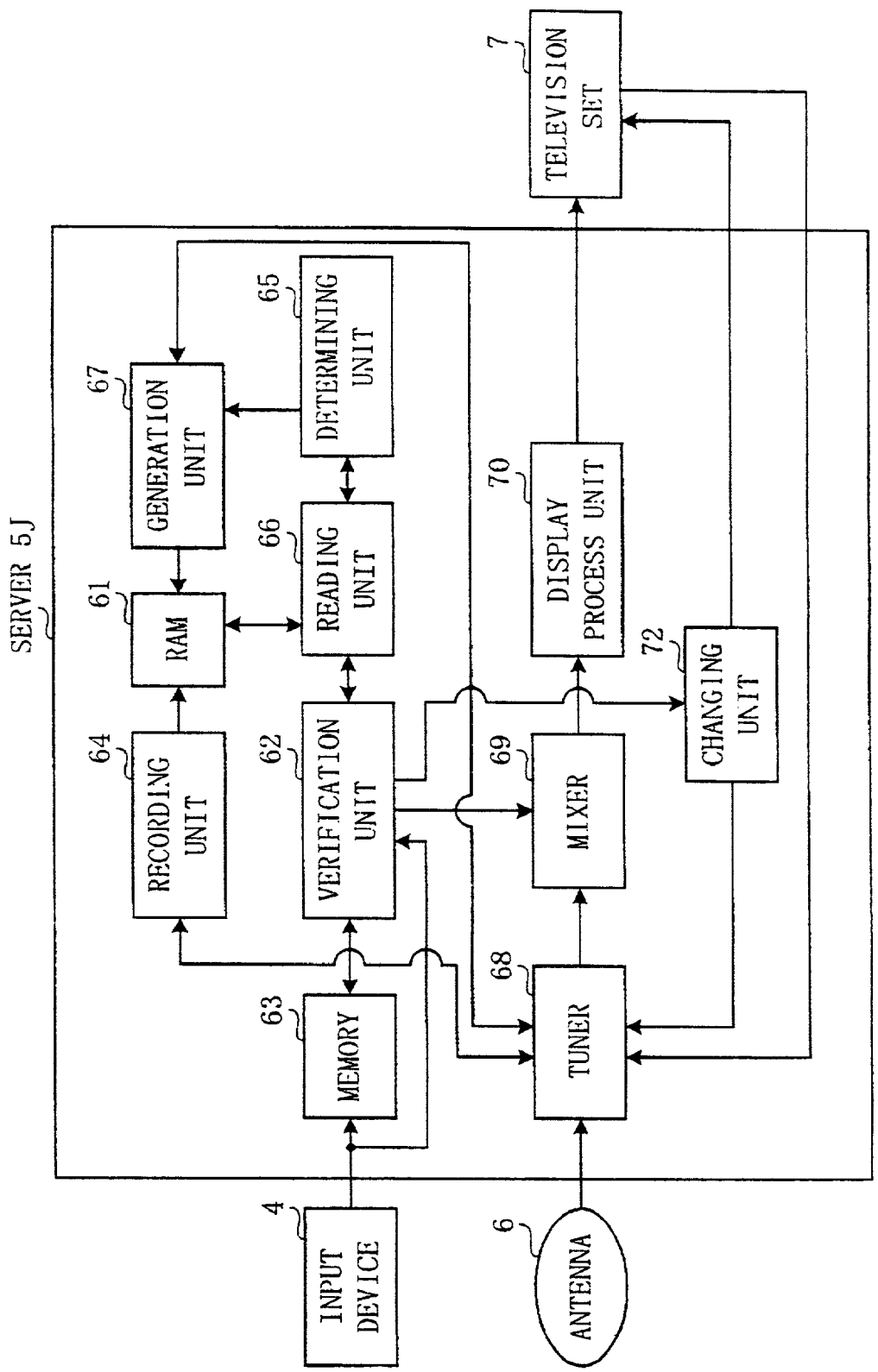
FIG. 19 is a block diagram showing a structure of a data communication system according to a ninth embodiment.

The data communication system comprises an input device 4, a server 5J, an antenna 6, and a television set 7, as shown in FIG. 19.

The input device 4, the antenna 6, and the television set 7 are substantially the same as those of the eighth embodiment.

The server 5J comprises a changing unit 72 in addition to the structure of the server 5I of the eighth embodiment shown in FIG. 16.

As will be described later, the verification unit 62 outputs information regarding a recommended program to the changing unit 72 when the start time of the recommended program comes, if the user to whom the recommended program should be presented is in front of the television set 7.

In response to the information regarding the recommended program supplied from the verification unit 62, the changing unit 72 controls the television set 7 to turn on, in a case where the power of the television set 7 has been turned off. Then, the changing unit 72 identifies the channel on which the recommended program is to be broadcast by using the supplied information. Then, the changing unit 72 controls the tuner 68 and the television set 7 to change the channel to the identified channel.

An operation which is performed when the verification unit 62 outputs information regarding a recommended program to the changing unit 72 will be specifically explained.

The verification unit 62 retrieves pre-announcement information stored in the RAM 61 at every predetermined interval (for example, every twenty minutes) by controlling the reading unit 66. Then, the verification unit 62 determines the start time of the recommended program by using the pre-announcement information.

Figure 20:
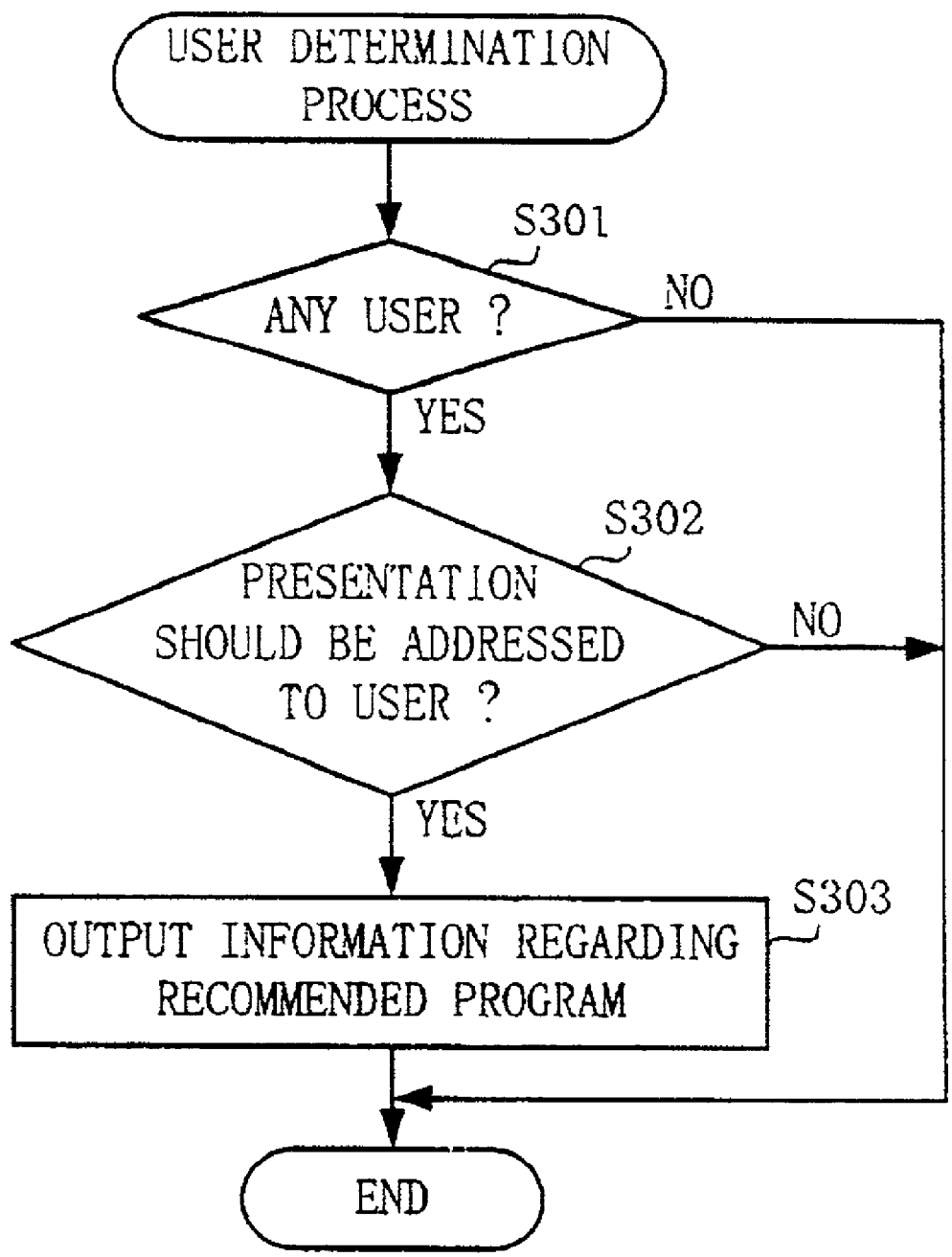
FIG. 20 is a flowchart for explaining a user determination process performed by a verification unit included in a server which constitutes the data communication system shown in FIG. 19.

When the determined start time comes, the verification unit 62 starts a user determination process shown in FIG. 20.

The verification unit 62 controls the input device 4 to acquire an image representing the front space of the television set 7. Then, the verification unit 62 determines whether or not there is any user in front of the television set 7 based on the acquired image (step S301).

In a case where it is determined that there is no user in front of the television set 7 (step S301; No), the verification unit 62 terminates the user determination process.

On the other hand, in a case where it is determined that there is a user in front of the television set 7 (step S301; Yes), the verification unit 62 determines whether or not the user in front of the television set 7 is the user to whom the recommended program should be presented (step S302). Specifically, the verification unit 62 determines whether or not the user in front of the television set 7 is the user to whom the recommended program should be presented by using information representing a user included in the pre-announcement information.

In a case where it is determined that the user in front of the television set 7 is not the user to whom the recommended program should be presented (step S302; No), the verification unit 62 terminates the user determination process.

On the other hand, in a case where it is determined that the user hi front of the television set 7 is the user to whom the recommended program should be presented (step S302; Yes), the verification unit 62 outputs the information regarding the recommended program to the changing unit 72 (step S303), and terminates the user determination process.

In response to the information regarding the recommended program supplied from the verification unit 62, the changing unit 72 controls the television set 7 to turn on, in a case where the television set 7 has been turned off.

Then, the changing unit 72 identifies the channel on which the recommended program is broadcast by using the supplied information.

The changing unit 72 controls the tuner 68 and the television set 7 to change the now selected channel to the identified channel. Thus, data representing the recommended program included in an electric wave received by the antenna 6 is supplied to the television set 7 via the tuner 68, the mixer 69, and the display process unit 70, and the recommended program is displayed on the television set 7.

The structure and operations other than the above are substantially the same as those of the eighth embodiment.

As described above, each user can watch a program which suits his/her preference without searching for a program which suits his/her preference or operating the television set 7.

In a case where it is determined that the user in front of the television set 7 is not the user to whom the recommended program should be presented, the verification unit 62 may instruct the recording unit 64 to record the recommended program. In accordance with the instruction from the verification unit 62, the recording unit 64 may acquire the data representing the recommended program via the tuner 68, and record the data in the RAM 61.

In the above described embodiments, the computer 3C may have a broadcast reception tuner, so that a television program may be displayed on the computer 3C.

The server apparatuses of the present invention can be realized by a general computer, without the need for a dedicated apparatus. A program and data for controlling a computer to execute the above described processes may be recorded on a medium (a floppy disk, a CD-ROM, a DVD, or the like) and distributed, and the program may be installed into the computer and run on an OS (Operating System) to execute the above described processes, thereby achieving the server apparatuses of the present invention. The above program and data may be stored in a disk device or the like included in a server device on the Internet, and embedded in a carrier wave. The program and data embedded in the carrier wave may be downloaded into the computer so as to realize the apparatuses of the present invention.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2001-23817 filed on Jan. 31, 2001, and including specification, claims, drawings and summary. The disclosure of the above Japanese Patent Application is incorporated herein by reference in its entirety.

What is claimed is:

1. A data reception apparatus comprising:
a first memory which stores data supplied to each of a plurality of users via a communication network;
a verifier which verifies a user;
a presenter which reads data which is supplied to the user who has been verified by said verifier from said first memory, and presents the data to the user;
a determiner which determines whether or not the supplied data includes information harmful to a specific user; and
a prohibiter which prohibits said presenter from reading the data which is determined as including harmful information by said determiner from said first memory, in a case where the user verified by said verifier is the specific user;
wherein said determiner pre-stores an image and a keyword representing the harmful information, and determines whether or not the supplied data includes the harmful information by determining whether or not the supplied data includes data representing the pre-stored image and keyword.

2. The data reception apparatus according to claim 1, further comprising:
a second memory which stores identification information for identifying each of the plurality of users; and
an inputter which inputs verification information for verifying the user,
wherein said verifier verifies the user by using the verification information and the identification information stored in said second memory.

3. The data reception apparatus according to claim 2, wherein the identification information and the verification information include one of image data representing a face of the user, character data representing a name of the user, and audio data representing a name of the user.

4. The data reception apparatus according to claim 1, wherein:
the data is data for use of a communication apparatus; and
said presenter presents the data to the user via a television set.

5. The data reception apparatus according to claim 4, wherein said communication apparatus is one of a telephone, a fax machine, and a computer.

6. The data reception apparatus according to claim 1, further comprising
a replier which sends reply data for notifying that the data has been received to a sender of the data.

7. A data reception apparatus comprising:
a presenter which presents data supplied from outside to a user via an external device;
a verifier which verifies the user of the external device; and
a preventer which prevents harmful information from being presented to the user verified by said verifier, in a case where data including the harmful information which is harmful to the user is supplied;
wherein said preventer pre-stores an image and a keyword representing the harmful information, and prevents the harmful information from being presented to the user in a case where the supplied data includes data representing the pre-stored image and keyword.

8. The data reception apparatus according to claim 7, further comprising:
a memory which stores identification information for identifying each of a plurality of users of the external device; and
an inputter which inputs verification information for verifying the user,
wherein said verifier verifies the user by using the verification information and the identification information stored in said memory.

9. The data reception apparatus according to claim 7, wherein
said preventer prohibits said presenter from supplying data to the external device, in a case where the data which has been supplied from outside includes information harmful to the user verified by said verifier.

10. The data reception apparatus according to claim 7, wherein:
the external device is a television set;
said presenter supplies data of a television program supplied from outside to the television set;
said data reception apparatus further comprises a detector which detects a television program including the harmful information;
said preventer determines whether or not the television program which is displayed on the television set corresponds to the television program detected by said detector, and prohibits the presenter from supplying the data to the television set in a case where it is determined that the displayed television program corresponds to the television program detected by said detector.

11. The data reception apparatus according to claim 10, wherein
said detector retrieves information regarding a television program via a public network or an antenna, and previously detects a television program which includes the harmful information by using the retrieved information.

12. The data reception apparatus according to claim 7, wherein
in a case where data including the harmful information is supplied, said preventer prevents the harmful information from being supplied to the user by processing the harmful information included in the data.

13. A data communication apparatus comprising:
a downloader which downloads latest data from an external server which has been accessed by each of a plurality of users by using a communication apparatus;
a verifier which verifies a user of the communication apparatus;
a presenter which presents the latest data downloaded by said downloader from the external server which has been accessed by the user verified by said verifier, to the user via the communication apparatus;

a determiner which determines whether or not the supplied data includes information harmful to a specific user; and a prohibiter which prohibits said presenter from reading the data which is determined as including harmful information by said determiner from said first memory, in a case where the user verified by said verifier is the specific user;

wherein said determiner pre-stores an image and a keyword representing the harmful information, and determines whether or not the supplied data includes the harmful information by determining whether or not the supplied data includes data representing the pre-stored image and keyword.

14. The data communication apparatus according to claim 13, further comprising:

a memory which stores identification information for identifying each of the plurality of users of the communication apparatus; and an inputter which inputs verification information for verifying the user, wherein said verifier verifies the user by using the verification information and the identification information stored in said memory.

15. A data reception method comprising:

storing data supplied to each of a plurality of users via a communication network in a memory;

verifying a user;

reading data supplied to the verified user from said memory and presenting the data to the user;

determining whether or not the supplied data includes information harmful to a specific user; and prohibiting reading of the data which is determined as including harmful information in a case where the user verified by said verifier is the specific user;

wherein said determiner pre-stores an image and a keyword representing the harmful information, and determines whether or not the supplied data includes the harmful information by determining whether or not the supplied data includes data representing the pre-stored image and keyword.

16. A data reception method comprising:

verifying a user of an external device;

receiving data supplied from outside and presenting the data to the verified user via the external device;

preventing harmful information from being presented to the verified user, in a case where data including the harmful information which is harmful to the user is supplied;

determining whether or not the supplied data includes information harmful to a specific user; and prohibiting reading of the data which is determined as including harmful information in a case where the user verified by said verifier is the specific user;

wherein said determiner pre-stores an image and a keyword representing the harmful information, and determines whether or not the supplied data includes the harmful information by determining whether or not the supplied data includes data representing the pre-stored image and keyword.

17. A data communication method comprising:

downloading latest data from an external server which has been accessed by each of a plurality of users by using a communication apparatus;

verifying a user of the communication apparatus;

presenting the latest data downloaded from the external server which has been accessed by the verified user to the user via the communication apparatus;

determining whether or not the supplied data includes information harmful to a specific user; and prohibiting reading of the data which is determined as including harmful information in a case where the user verified by said verifier is the specific user;

wherein said determiner pre-stores an image and a keyword representing the harmful information, and determines whether or not the supplied data includes the harmful information by determining whether or not the supplied data includes data representing the pre-stored image and keyword.

18. An apparatus comprising:

a receiver adapted to receive data directed to one of a plurality of users;

a memory adapted to store the data received by the receiver;

a communication network adapted to supply the data from the memory to the one user;

a verifier adapted to verify the user;

a presenter adapted to read the data from the memory when the user has been verified by the verifier and present the data to the user;

a determiner which determines whether or not the supplied data includes information harmful to a specific user; and a prohibiter which prohibits said presenter from reading the data which is determined as including harmful information by said determiner from said memory, in a case where the user verified by said verifier is the specific user;

wherein said determiner pre-stores an image and a keyword representing the harmful information, and determines whether or not the supplied data includes the harmful information by determining whether or not the supplied data includes data representing the pre-stored image and keyword.

* * * * *